United States Patent
Lent et al.

(10) Patent No.: US 7,143,063 B2
(45) Date of Patent: Nov. 28, 2006

(54) METHOD AND APPARATUS FOR A VERIFIABLE ON LINE REJECTION OF AN APPLICANT FOR CREDIT

(75) Inventors: Jeremy R. Lent, Corte Madera, CA (US); Mary Lent, Corte Madera, CA (US); Eric R. Meeks, San Francisco, CA (US); Yinzi Cai, Fremont, CA (US); Timothy J. Coltrell, Danville, CA (US); David W. Dowhan, Mountain View, CA (US)

(73) Assignee: NextCard, Inc., Marlton, NJ (US)

( * ) Notice: Subject to any disclaimer, the term of this patent is extended or adjusted under 35 U.S.C. 154(b) by 0 days.

(21) Appl. No.: 10/386,390

(22) Filed: Mar. 10, 2003

(65) Prior Publication Data

US 2004/0039687 A1    Feb. 26, 2004

Related U.S. Application Data

(63) Continuation of application No. 09/185,878, filed on Nov. 3, 1998, now Pat. No. 6,567,791.

(51) Int. Cl.
*G06F 17/60* (2006.01)

(52) U.S. Cl. ............................ 705/38; 705/26; 705/35; 705/38; 705/39; 705/42; 705/70; 705/80

(58) Field of Classification Search .................. 705/38, 705/39, 42, 35, 26, 70, 80
See application file for complete search history.

(56) References Cited

U.S. PATENT DOCUMENTS

| | | | |
|---|---|---|---|
| 5,187,735 A | 2/1993 | Herrero Garcia et al. ..... 379/88 |
| 5,239,462 A | 8/1993 | Jones et al. .................. 364/408 |
| 5,262,941 A | 11/1993 | Saladin et al. .............. 364/408 |
| 5,387,783 A | 2/1995 | Mihm et al. ................. 235/375 |
| 5,450,537 A | 9/1995 | Hirai et al. .................. 395/149 |
| 5,611,052 A | 3/1997 | Dykstra et al. ............. 395/238 |
| 5,696,907 A | 12/1997 | Tom ............................ 395/238 |
| 5,704,029 A | 12/1997 | Wright, Jr. .................. 395/149 |
| 5,727,163 A | 3/1998 | Bezos ......................... 395/227 |
| 5,745,654 A | 4/1998 | Titan ............................ 395/22 |
| 5,761,640 A | 6/1998 | Kalyanswamy et al. .... 704/260 |
| 5,774,882 A | 6/1998 | Keen et al. .................... 705/38 |
| 5,774,883 A | 6/1998 | Andersen et al. ............. 205/38 |
| 5,797,133 A | 8/1998 | Jones et al. .................... 705/38 |
| 5,819,029 A | 10/1998 | Edwards et al. ............. 395/186 |

(Continued)

FOREIGN PATENT DOCUMENTS

EP    0840244 A1    6/1998

(Continued)

OTHER PUBLICATIONS

Anon, "Citgo Puts a New Spin o the Cobranded Oil Card", Credit Card News, p. 4, Nov. 1, 1995.

(Continued)

*Primary Examiner*—Bradley B. Bayat
(74) *Attorney, Agent, or Firm*—Van Pelt, Yi & James LLP

(57) ABSTRACT

A system and method are disclosed for presenting a reason for the rejection of a credit application from an applicant is disclosed. The method includes obtaining a factor from a credit bureau identified as a factor that influences the FICO score assigned to the application by the credit bureau. The factor identified by the credit bureau is mapped to an internal rejection code. A rejection reason is provided that corresponds to the internal rejection code to the applicant.

8 Claims, 19 Drawing Sheets

U.S. PATENT DOCUMENTS

| | | | |
|---|---|---|---|
| 5,819,236 A | 10/1998 | Josephson | 705/35 |
| 5,819,291 A | 10/1998 | Haimowitz et al. | 707/201 |
| 5,832,465 A * | 11/1998 | Tom | 706/51 |
| 5,870,721 A | 2/1999 | Norris | 705/38 |
| 5,878,403 A | 3/1999 | DeFrancesco et al. | 705/38 |
| 5,911,135 A | 6/1999 | Atkins | 705/36 |
| 5,930,776 A | 7/1999 | Dykstra et al. | 705/38 |
| 5,940,811 A | 8/1999 | Norris | 705/38 |
| 5,940,812 A | 8/1999 | Tengel et al. | 705/38 |
| 5,950,179 A | 9/1999 | Buchanan et al. | 705/38 |
| 5,960,411 A | 9/1999 | Hartman et al. | 705/26 |
| 5,966,699 A | 10/1999 | Zandi | 705/38 |
| 5,970,478 A | 10/1999 | Walker et al. | 705/35 |
| 5,987,434 A | 11/1999 | Libman | 705/36 |
| 5,991,740 A | 11/1999 | Messer | 705/27 |
| 5,995,947 A | 11/1999 | Fraser et al. | 705/38 |
| 6,000,832 A | 12/1999 | Franklin et al. | 364/479.02 |
| 6,014,645 A | 1/2000 | Cunningham | 705/38 |
| 6,029,149 A | 2/2000 | Dykstra et al. | 705/38 |
| 6,029,890 A | 2/2000 | Austin | 235/381 |
| 6,064,987 A | 5/2000 | Walker et al. | 705/38 |
| 6,088,686 A | 7/2000 | Walker et al. | 705/38 |
| 6,105,007 A | 8/2000 | Norris | 705/38 |
| 6,112,190 A | 8/2000 | Fletcher et al. | 705/38 |
| 6,119,103 A | 9/2000 | Basch et al. | 705/35 |
| 6,182,124 B1 | 1/2001 | Lau et al. | 709/217 |
| 6,192,380 B1 | 2/2001 | Light et al. | 707/505 |
| 6,199,079 B1 | 3/2001 | Gupta et al. | 707/507 |
| 6,202,053 B1 | 3/2001 | Christiansen et al. | 705/38 |
| 6,208,979 B1 | 3/2001 | Sinclair | 705/38 |
| 6,272,506 B1 | 8/2001 | Bell | 707/507 |
| 6,289,319 B1 | 9/2001 | Lockwood | 705/35 |
| 6,311,169 B1 | 10/2001 | Duhon | 705/38 |
| 6,349,290 B1 | 2/2002 | Horowitz et al. | 705/35 |
| 6,385,594 B1 | 5/2002 | Lebda et al. | 705/38 |
| 6,405,181 B1 | 6/2002 | Lent et al. | 705/38 |
| 6,438,526 B1 | 8/2002 | Dykes et al. | 705/38 |
| 6,567,791 B1 * | 5/2003 | Lent et al. | 705/38 |
| 2001/0011246 A1 | 8/2001 | Tammaro | 705/38 |
| 2001/0011282 A1 | 8/2001 | Katsumata et al. | 707/505 |
| 2001/0014877 A1 | 8/2001 | Defrancesco et al. | 705/38 |
| 2004/0064412 A1* | 4/2004 | Phillips et al. | 705/41 |

FOREIGN PATENT DOCUMENTS

| | | |
|---|---|---|
| WO | WO97/22073 | 6/1997 |

OTHER PUBLICATIONS

Anon, Microsoft Targets more than PIM Market with Outlook 2000, Computer Reseller News, n805, p. 99, Aug. 1998.

Anon, "To Boost Balances, AT&T Renews No-Fee Universal Credit Card Offer", Report on AT&T, V10, n.13, Mar. 30, 1992.

Bank Technology News, Low Rent Loan Officer in a Kiosk, v8, No. 2, p. 5, Feb. 1995.

Block, Valerie, "Network Assembles Card Issuers at an Internet Site", Am. Banker, V160, n 198, p. 11.

Borowsky, Mark, "The Neural Net: Predictor of Fraud or Victim of Hype?", Bank Technology News, p. 7, Sep. 1993.

Calvey, Mark, "Internet Gives Bankers a Snappy Comeback", S. F. Business Times, v. 13, n. 5, p. 3, Sep. 11, 1998.

Canter, Ronald S., "Lender Beware-Federal Regulation of Consumer Credit", Credit World, v8, n5, pp. 16-20, May/Jun. 1993.

Chesanow, Neil, "Pick the Right credit Cards and use them wisely", Medical Economics, v75, n16, p94, Aug. 1998.

The New Encyclopedia Britannica, vol. 3, 15th Edition, "Credit".

Credit Card Network, USA, http://www.creditnet.com/consumers.html.

CreditNet Financial Network, http://consumers.creditnet.com.

Duclax, Denise, A Check for $5,000, in Ten Minutes, ABA Banking Journal, v87, n8, p. 45, Aug. 1995.

FICO, http://houseloans.idis.com/fico.html.

FIData, Inc, Press Release, Aug. 26.

Friedland, Marc, "Credit Scoring Digs Deeper into Data", Credit World, v84, n5, p. 19-23, May-Jun. 1996.

Handley, John, "Credit Review Lets the Nos. Do the Talking in Home Mortgage Game", Chicago Tribune, Jul. 12, 1998.

Hollander, Geoffrey, "Sibling Tool Personator 3 Untangles File Formats", InfoWorld, v20, n5, p. 102, Feb. 2, 1998.

Kantrow, Yvette D., "Banks Press Cardholders to Take Cash Advances", American Banker, v157, n18, p. 1.

Web Page Results for FICO: Altavista.com, Mar. 20, 2001.

Lotis Delivers Pre-Release of Lotus Notes 4.6 Client Provides Compelling New Integration with Internet Explorer, May 20, 1997 Press Release.

McCormick, Linda W., "Users of Credit Scoring Face Tough Rules on Notification", American Banker—May 21, 1982.

McShane, Peter K., "Got Financing?", Business Journal Serving Southern Tier, CNY, Sep. 15, 1997, vol. 11, Isue 19, p. 9.

Phillips 66 Introduces Mastercard with Rebate Feature, PR Newswire, Sep. 14, 1995.

"Reengineering Update-Outsourcing: An Option Full of Benefits and Responsibilities", American Banker, Oct. 24, 1994.

Sherman, Lee, "Wells Fargo Writes a New Online Script", Interactive Week, V5, n31, p. 19, Aug. 1998.

Staff, "On Line System Approves Loans while Customer Waits", Communications News, v. 31, N. 9, p. 27, Sep. 1994.

Stetenfeld, Beth, "Credit Scoring: Finding the Right Recipe", Credit Union Management, v17, n11, p. 24-26, Nov. 1994.

"VAR Agreement Expands Credit Bureau Access", Computers in Banking, v6, n10, p. 58.

"Wells Fargo Launches First Real-Time, Online Home Equity Credit Decision-Making Service", Business Wire, Jun. 3, 1998.

"What Do FICO Scores Mean to Me?", http://www.sancap.com, Nov. 4, 1999.

"What is a FICO Score?", http://www.aspenloan.com Nov. 4, 1999.

"What the Credit Bureau is Saying about you: If a Mistake Sneaks into your Record, you may not Know About it Until you get Turned down for Credit", Changing Times, v37, p. 56—Jul. 1983.

"World Wide Web enhances customer' choice", Cards International, n.143, p. 9, Nov. 9, 1995.

Anon., "Lending Tree: Lending Tree Provides Borrowers Fast and Easy Online Access to Multiple Loan Offers," Business Wire, Jun. 23, 1998.

Anon, Regulation Z Commentary Amendments, Retail Banking Digest, vol. 15, No. 2, p. 17-18, Mar.-Apr. 1995.

Anon, San Diego Savings Association Offers Customers No-Fee Visa Product, Card News, Feb. 29, 1988.

Black, H.C., Black's Law Dictionary, p. 1586-1589, West Publishing Co., St. Paul, Minnesota, 1990.

Bloom, J.K., "For This New Visa, Only Web Surfers Need Apply," American Banker, vol. 1163, No. 34, 12, Feb. 20, 1998.

Harney, K.R., "Realty Brokers, Lenders Face Restrictions," Arizona Republic, Final Chaser edition, Sun Living section, p. S7, Feb. 10, 1991.

Higgins, K.T., "Mr. Plastic Joins the Marketing Team," Credit Card Management, vol. 6, No. 3, pp. 26-30, Jun. 1993.

* cited by examiner

| External Code | Internal Code | Internal decline reason |
|---|---|---|
| E1 | I1 | General reason |
| E2 | I1 | General reason |
| E3 | I1 | General reason |
| E4 | I4 | Specific reason |
| E5 | I5 | Specific reason |

*FIG. 8B*

| FICO range | Income range | Balance Transfer | Offer 1 | Offer 2 | Offer 3 | Offer 4 |
|---|---|---|---|---|---|---|
| 500-550 | 40,000-45,000 | 1000 | Link1 | Link2 | Link3 | Link4 |
| 551-600 | 35,000-40,000 | 750 | Link1 | Link2 | Link3 | Link4 |
| 601-650 | 46,000-50,000 | 500 | Link1 | Link2 | Link3 | Link4 |
| . | . | . | . | . | . | . |
| . | . | . | . | . | . | . |
| . | . | . | . | . | . | . |

*FIG. 11*

| | Rate | Annual Fee | Credit Limit | Required Balance Transfer |
|---|---|---|---|---|
| Offer 1 | 5.9% | 0 | 20,000 | 12,000 |
| Offer 2 | 6.9% | 0 | 15,000 | 8,000 |
| Offer 3 | 8.9% | 0 | 10,000 | 4,000 |
| Offer 4 | 14.9% | 20 | 5,000 | 0 |

*FIG. 12*

METHOD AND APPARATUS FOR A VERIFIABLE ON LINE REJECTION OF AN APPLICANT FOR CREDIT

This is a Continuation of application Ser. No. 09/185,878, filed Nov. 3, 1998 now U.S. Pat. No. 6,567,791, which is hereby incorporated by reference

BACKGROUND OF THE INVENTION

1. Field of the Invention

The present invention relates generally to methods and apparatuses for electronic commerce. More specifically, the invention relates to methods and apparatuses for evaluating the reason for rejecting a credit card applicant and supplying an appropriate reason for such rejection.

2. Relationship to the Art With the advent of electronic commerce on the Internet, applicants have begun to expect decisions that have historically required a period of days or weeks to be made instantly when processed on line. Numerous transactions such as purchases of consumer goods, airline tickets, and movie tickets have been adapted for execution on line in a matter of seconds. What has not been perfected is the ability to make a credit decision and grant credit to a party on line in real time. (For the purpose of this specification, "instant" or "real time" credit means within a short period of time within less than about five minutes.) As a result, virtually all Internet commerce to date requires some previously secured method of payment such as a credit card obtained by conventional means or other previously arranged payment source such as a bank account or electronic money.

Many credit card issuers provide applications on line that may be filled out by applicants. However, the underwriting decision for such applications is not made and communicated on line. If such a decision could be made on line and communicated to the applicant, it would be important for rejected applicants to communicate the rejection in a manner that is consistent with the legal requirements for rejecting credit applicants.

When a credit card issuer rejects an applicant, there are specific legal requirements for how that rejection must be made. These requirements are set forth in detail at 37 CFR 202 et. seq. In addition to meeting the various legal requirements, it would be desirable to provide rejected applicants with a reason for rejection that makes sense to the rejected applicant for the purpose of increasing goodwill and decreasing incidence of complaints. Raw credit bureau data may provide certain factors that were relevant to the determination of a FICO score for an applicant. However, such factors often may not provide a reasonable basis for rejection, since certain positive factors such as home ownership may be included for rejected applicants.

In addition, it would be desirable if a method could be developed for verifying that a rejected applicant has downloaded and viewed a rejection message. If such a method could be developed with sufficient reliability to meet the legal requirements of rejecting an applicant, then it could potentially be possible to avoid the cost of having to send a rejection notice letter to rejected applicants.

SUMMARY OF THE INVENTION

Accordingly, the present invention provides a method of determining an appropriate reason for rejecting a credit applicant based on data obtained from one or more credit reports. Important factors influencing the applicant's FICO score are analyzed and inappropriate rejection factors are discarded. In addition, other attributes derived from the applicant's credit report are analyzed and it is determined whether any of those attributes are appropriate rejection factors.

It should be appreciated that the present invention can be implemented in numerous ways, including as a process, an apparatus, a system, a device, a method, or a computer readable medium. Several inventive embodiments are described below.

In one embodiment, a method of presenting a reason for the rejection of a credit application from an applicant is disclosed. The method includes obtaining a factor from a credit bureau identified as influencing the FICO score assigned to the application by the credit bureau. The factor identified by the credit bureau is mapped to an internal rejection code. A rejection reason that corresponds to the internal rejection code is provided to the applicant.

These and other features and advantages of the present invention will be presented in more detail in the following specification of the invention and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 8B is a diagram illustrating one data structure used to map main FICO factors provided by the credit bureau (referred to as external codes) to internal decline codes as well as reasons for rejection to be provided to rejected applicants.

FIG. 11 is another data representation illustrating another embodiment of how the offers may be determined based on FICO score, income range, income, and total revolving balance transfer.

FIG. 12 is a diagram illustrating a display provided to the applicant for the purpose of presenting multiple offers to the applicant.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
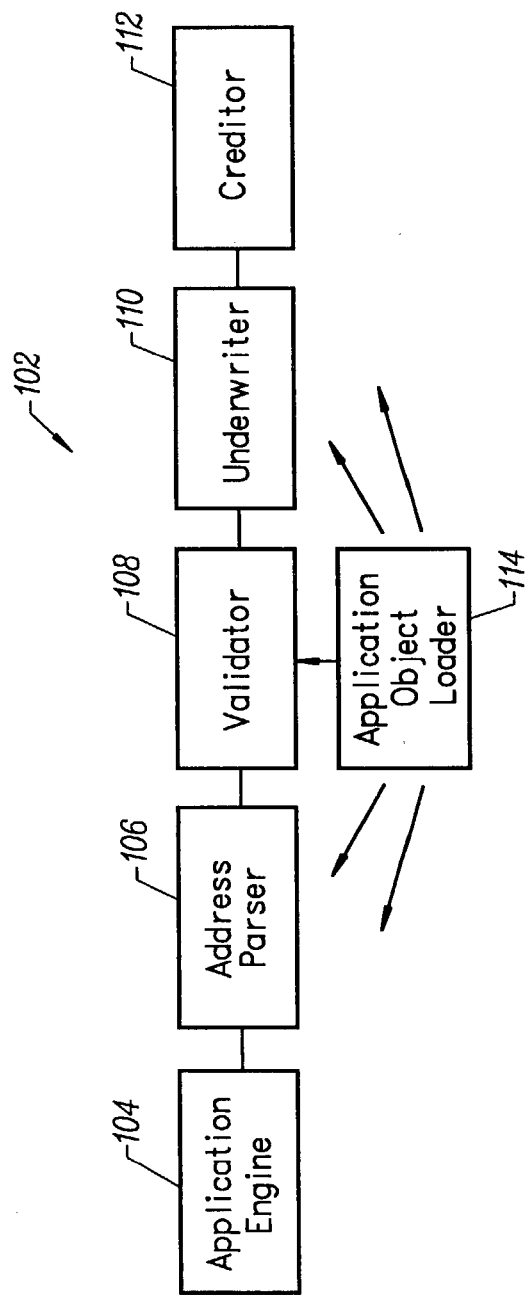
FIG. 1 is a block diagram illustrating a preferred architecture for a system that provides instant on-line credit card approval.

FIG. 1 is a block diagram illustrating a preferred architecture 102 for a system that provides instant on-line credit card approval. As shown, an application engine 104 creates an application by prompting an applicant for data and storing the entered data. In one embodiment, the application engine creates an application by communicating with the applicant over the World Wide Web using Java, html or other commonly used Internet protocols. In other embodiments, other types of connections may be established between the applicant and the application engine. The application includes applicant data such as the applicant's address and social security number. Once created, the application is received by the parsing engine 106 which parses an applicant's name and address and creates appropriate software objects.

The parsing engine 106 parses the data into an exact format that may be used to directly access credit bureau data. The applicant is given an opportunity to view how the data submitted has been parsed and to make corrections to parsed data, if necessary. The parsing engine 106 is described in further detail in FIG. 4B. The parsed data is passed to a Validator 108. Validator 108 validates certain data entered by the applicant such as the social security number and zip code. Validation may include checking either the form of a number to ensure that the correct number of digits have been entered or checking content such as checking that the area code portion of a phone number is a valid area code or checking that a zip code matches a city. If the data is determined to be valid, then the validated data is input to an Underwriter 110. It is important to avoid sending invalid data to the Underwriter to avoid the cost of requesting credit reports that cannot be used.

Underwriter 110 receives data from the parsing engine and evaluates the data to determine if the applicant should receive an offer for credit. In one embodiment, the Underwriter sends the parsed data to at least two credit bureaus, receives data from the credit bureaus, and makes an underwriting decision based on an analysis of the credit bureau data. The analysis may include, but is not limited to, comparing the applicant's Fair Isaac Risk Score (FICO score) to certain thresholds. Underwriter 110 is described in further detail in FIGS. 6A and 6B. If the Underwriter determines that an offer of credit should be extended to the applicant, then an offer is made in real time to the applicant. As is described below, the offer may include one or more sets of alternative terms and those terms may be conditioned on the applicant taking certain actions such as transferring balances. The applicant may be required to actually take such actions in real time before an offer conditioned on such actions is confirmed. If the Underwriter determines that no offer of credit should be extended, then the Underwriter determines a reason for rejecting the applicant.

Whether an offer is extended and accepted or not, information about the offer or the rejection is passed to a creditor module 112 that finalizes the offer and builds a data file that is in the proper form to be sent to First Data Resources, Inc. (FDR), or another such entity that provides a similar service to FDR's service. During the finalization of the offer, FDR data is built for all approved and declined applications. FDR handles the embossing of the card and delivering it to approved applicants. FDR also handles sending rejection letters to rejected applicants.

If, at any time during the process, a system error occurs that interrupts the process, then an application object loader 114 loads the appropriate application for reentry into the system. It should be noted that in one embodiment, the data that is processed and stored by each module is stored as an application object as is described further in FIG. 2. In other embodiments, the data is stored in other ways, such as in a table or in a database.

Figure 2:
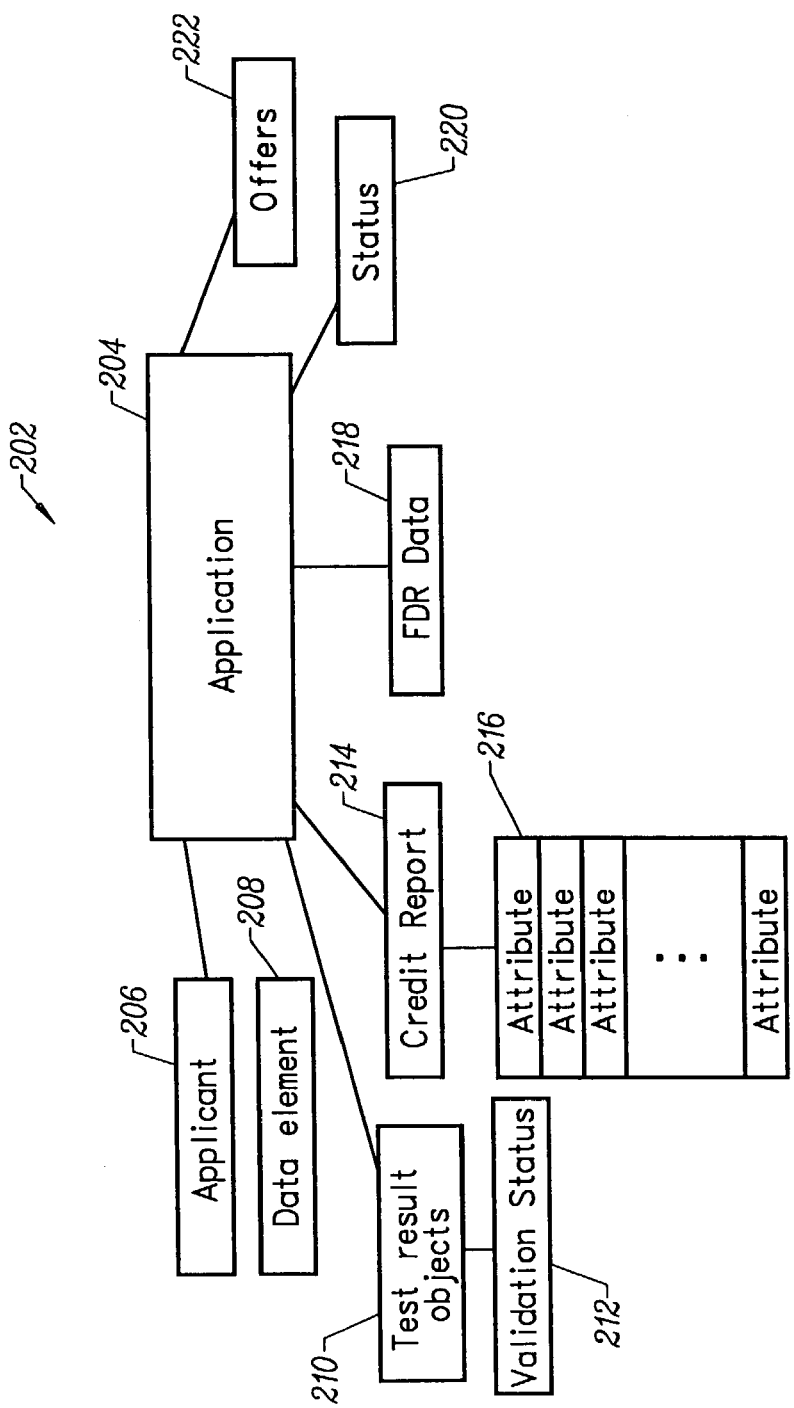
FIG. 2 is a block diagram illustrating an application data structure that is used in one embodiment to store the data contained in an application and to keep track of the status of the application as it progresses through the various modules described in FIG. 1.

FIG. 2 is a block diagram illustrating an application data structure 202 that is used in one embodiment to store the data contained in an application and to keep track of the status of the application as it progresses through the various modules described in FIG. 1. It should be noted that other data structures may be used in other embodiments within the scope of this invention. Application data structure 202 includes an application object 204 that is created by the application engine. Application object 204 points to a number of associated data structures, including an applicant object 206. Applicant object 206 stores applicant data and includes one or more data elements 208. For example, an applicant data element 208 may include information such as the applicant's address, phone number, or social security number. The application data structure also includes one or more test result objects 210. Each test result object 210 stores a validation status 212 associated with a validation test applied to the data associated with applicant object 206. For example, a test result object may include a social security number status indicating whether the social security number entered by the applicant is a valid social security number. Also, a test result object 210 may include a zip code status indicating whether the zip code entered by the applicant matches the rest of the address entered by the applicant. Test result objects are used to check whether data entered by the applicant is valid before certain actions are taken, such as a credit report being ordered.

The application data structure further includes a set of credit report objects 214 associated with each credit report ordered. In one embodiment, the Underwriter requires at least two credit reports from two of three credit bureaus before a decision to grant credit is made. This rule effectively enables a real time credit decision to be made without incurring an unacceptable amount of risk. Since credit reports are preferably ordered from more than one credit bureau, the application data structure will likely include several credit report objects. Each credit report object 214 includes a plurality of attributes 216. An attribute is an item of data provided by the credit bureau in the credit report. For example, one such attribute is a 90 day attribute that indicates the number of times that the applicant has been more than 90 days late in payment of a debt. Similarly, a 60 day attribute may be provided. Other attributes may include a FICO score, the number of times the applicant has been severely delinquent, existence of a derogatory public record, whether the applicant is now delinquent, the applicant's total revolving balance, and the amount of time that a credit report has been on file for the applicant (also referred to as "thickness of file" or "time on file."

As is described below, in one embodiment, the Underwriter bases its decision on the FICO score alone when the FICO score is below a rejection threshold. In some embodiments, there may be automatic approval when the FICO score is above an approval threshold.

The application data structure further includes FDR data object 218 associated with the application. FDR data is created by the creditor module for the purpose of sending application information to FDR so that FDR may send credit cards to successful applicants and send rejections to unsuccessful applicants, when that is required.

The application object also includes a status object 220. The status of the application object is determined at various times by the modules. For example, the Validator module may determine that the application is invalid based on an invalid social security number or zip code. The Underwriter module may also determine that the application is a duplicate, as will be described below. The Underwriter may also change the status of an application to accepted or declined. In addition, certain applications may be tagged with a fraud status flag indicating that there is a likelihood of fraud. The application data structure also may include a set of offers 222 to be provided to the applicant.

Thus far, the software architecture and data structure used to make a real time credit decision in one embodiment have been described. Next, the processes implemented in the modules will be described.

Figure 3:
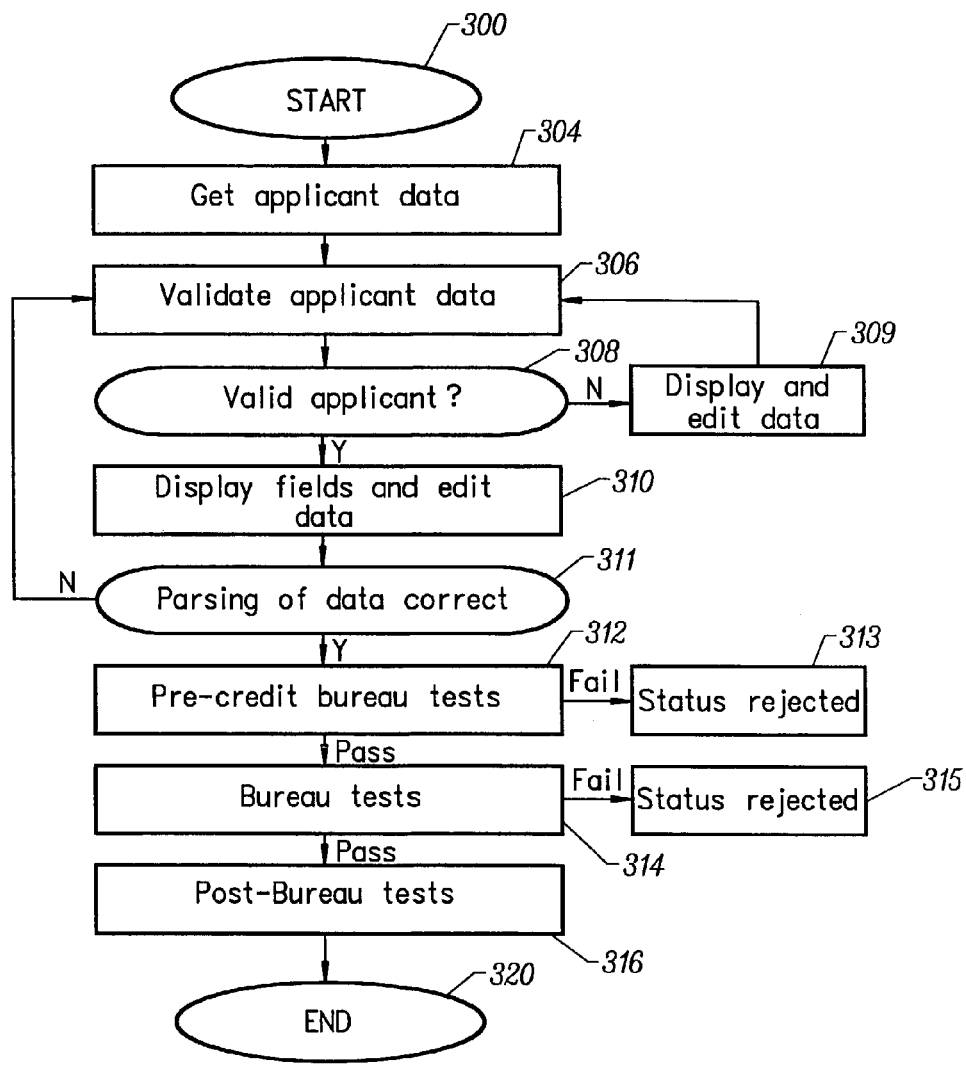
FIG. 3 is a flow chart illustrating the general process flow through the modules of FIG. 1.

FIG. 3 is a flow chart illustrating the general process flow through the modules of FIG. 1. The process starts at 300. In a step 304, applicant data is obtained via html, Java or other suitable network protocol. It should be noted that in different embodiments, the information entered by the applicant may be either parsed first by the parsing engine or validated first by the Validator. For the purpose of illustrating this point, FIG. 3 shows Validation occurring first in a step 306. FIG. 1 alternatively shows the parsing engine operating first. If the information is not valid, then control is transferred from a step 308 to a step 309 and the applicant is given an opportunity to edit the data. The Validator then rechecks the edited data.

If the information is valid, then control is transferred to a step 310 where the data entered is displayed along with the field assigned to each part of the data by the parsing engine. This step is important to ensure that the data will be readable when it is sent to a credit bureau by the Underwriter. An exact match is required by the credit bureaus for the correct credit report to be sent. Various ambiguities in the way that an address may be expressed can cause difficulties. Such difficulties have been a significant factor in preventing other systems from allowing individuals to directly access credit bureau data. For example, it is necessary to distinguish a street direction that is part of a street address from a street name that happens to be a direction, such as "North."

To make certain that such distinctions as well as other distinctions are made correctly, the parsing engine categorizes each part of the entered address and presents the field names along with that portion of the address that it has assigned to each field name. So, for example, the applicant can move "North" from a street direction field to a street name field if that is appropriate. Thus, by parsing the address and assigning the different parts to fields and then allowing the applicant to check and edit the assignment, the parsing engine enables applicants with no knowledge of the Byzantine structure required by the credit bureaus to enter personal data in a manner that allows a credit report to be obtained without human intervention.

Initial parsing is achieved by analyzing the form of the address and dividing, for example, the street number, street name, city and state. However, regardless of the care taken in designing initial parsing, some miscategorization will likely occur. Displaying the parsing to the applicant and allowing the applicant to correct parsing errors enables the imperfect output of the parsing engine to be corrected. At the same time, the process is much more user friendly and less tedious for the user than if the user had been asked to enter each field that the address is divided into by the parsing engine separately. By having the parsing engine parse the address and present the result of the parsing to the user, tedium is minimized and accuracy is achieved.

If the applicant responds that the data and parsing is correct instead of editing the parsing of the data into the displayed fields in step 310, then a step 311 transfers control to a step 312 where pre-credit bureau tests are run on the data. If the applicant edits the data, then control is transferred back to step 306 and the data is re-checked for validity. If the applicant fails the pre-credit bureau test, then the applicant's status is changed to rejected in a step 313 and if the applicant passes the pre-credit bureau test, then the credit bureaus are accessed and credit bureau tests based on the data obtained from the credit bureau and other applicant data are performed in a step 314. If the applicant passes the credit bureau tests, then post credit bureau tests are run in a step 316. If the applicant passes the post credit bureau tests, then the applicant is accepted to receive an offer for credit and the approval process ends at 320.

If the applicant fails the credit bureau tests, then the application status is changed to rejected in a step 315. As described below, an on line rejection process is executed for applications with a rejected status. Thus, the applicant information is input to a series of tests and the result of the tests determines whether the applicant is accepted or rejected.

Figure 4A:
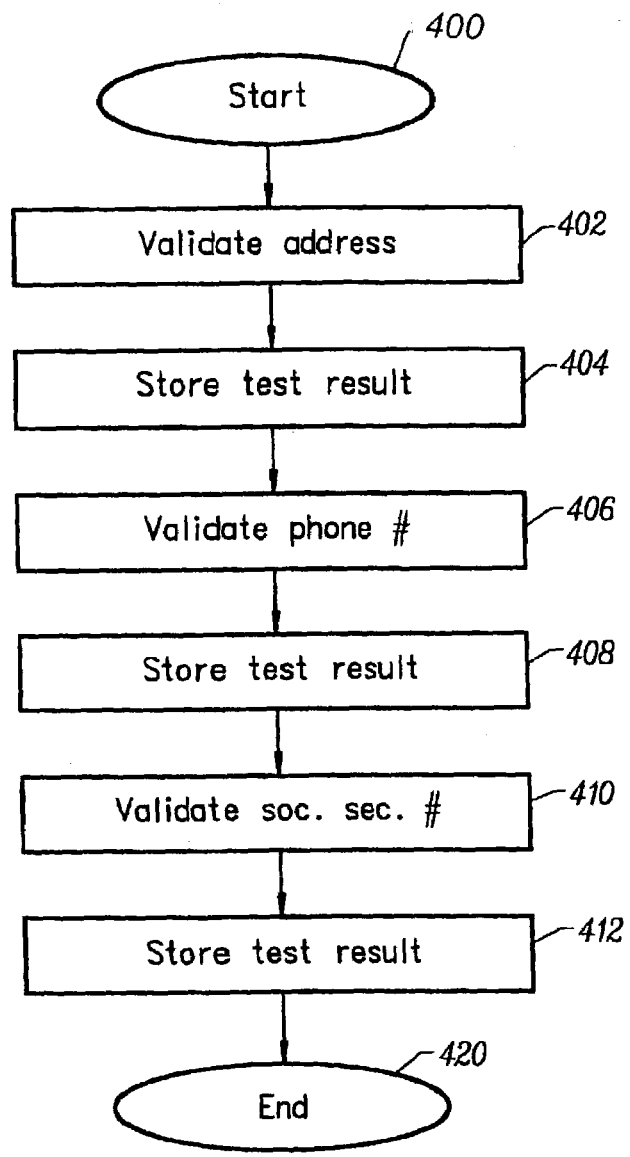
FIG. 4A is a flow chart illustrating a validation process that is used in step according to one embodiment of the invention.

FIG. 4A is a flow chart illustrating a validation process that is used in step 306 according to one embodiment of the invention. The Validator performs a plurality of validation tests on the applicant data. The process starts at 400. In a step 402, the applicant's address is validated according to an address validation test. In one embodiment, address validation includes checking that a street number and street name are entered and not a PO box. Next, in a step 404, a validation status associated with the address validation test is stored in a test result object. In a step 406, the applicant's phone number is validated according to a phone number validation test. The phone number validation test may include checking the number versus one or more tables or checking that an appropriate number of digits are provided. In a step 408, a validation status associated with the phone number validation test is stored in a test result object. Finally, in a step 410, the applicant's social security number is validated according to a social security number validation test. In a step 412, a validation status associated with the social security number validation test is stored in a test result object and the process ends at 420.

In this manner, the form of the data entered by the applicant is checked to determine whether the data entered is at least potentially correct. For example, if a social security number that does not exist for anyone is entered, it can be determined that the entered data must be invalid. In other embodiments, additional validation tests may be performed. Specifically, validation tests that help detect fraud may be implemented. In one embodiment, the validation status associated with each test result object includes a time stamp. Multiple applications with the same or similar names may be tracked and a history may be saved. Fraud tests may be implemented that track the number of applications submitted by a given individual and check the consistency of applicant data between multiple submitted applications.

Figure 4B:
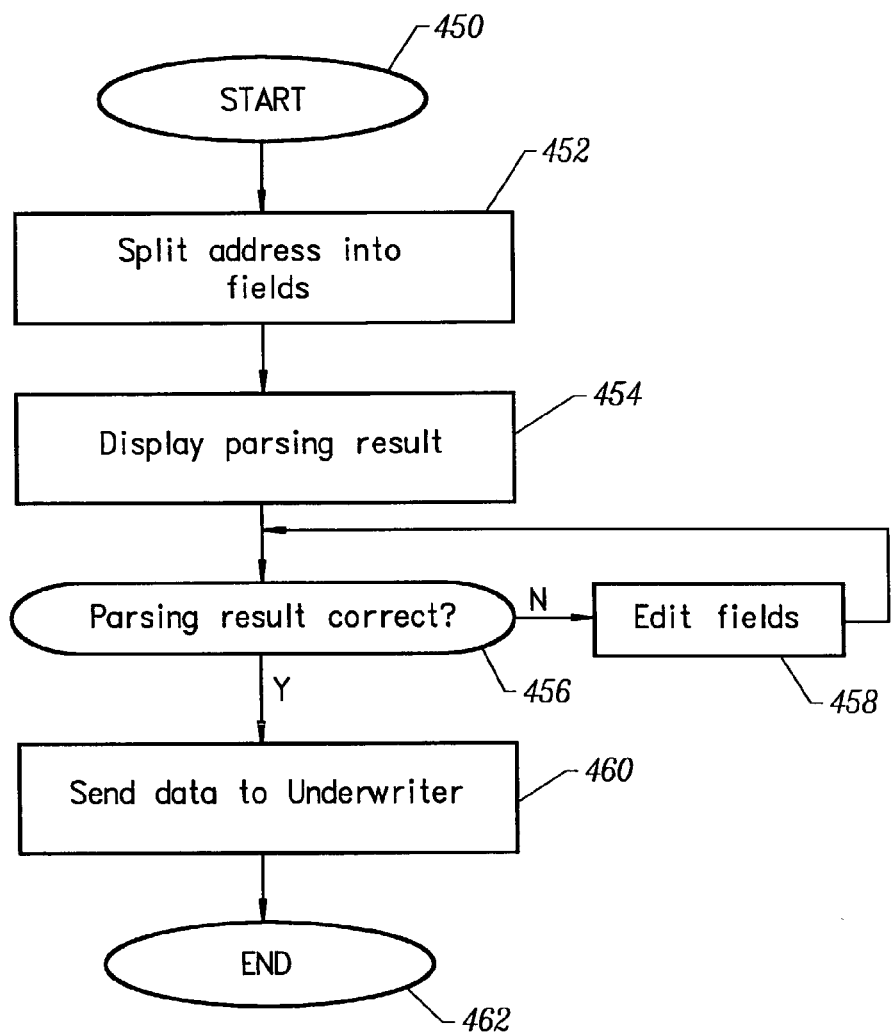
FIG. 4B is a flow chart illustrating a process for parsing an address entered by an applicant.

FIG. 4B is a flow chart illustrating a process for parsing an address entered by an applicant. The process starts at 450. In a step 452, the address is split into fields using a parser. Next, In a step 454, the parsing result is displayed. The applicant is prompted to indicate whether or not the parsing result is correct in a step 456. If the result is not correct, then control is transferred to a step 458 and the applicant is allowed to change the fields assigned to each part of the data. Once the parsing is approved by the applicant, control is transferred to a step 460 and the parsed data is sent to the Underwriter. It should be noted that the data may also be sent through the validator again if the data was changed by the user. The process ends at 462.

Figure 5:
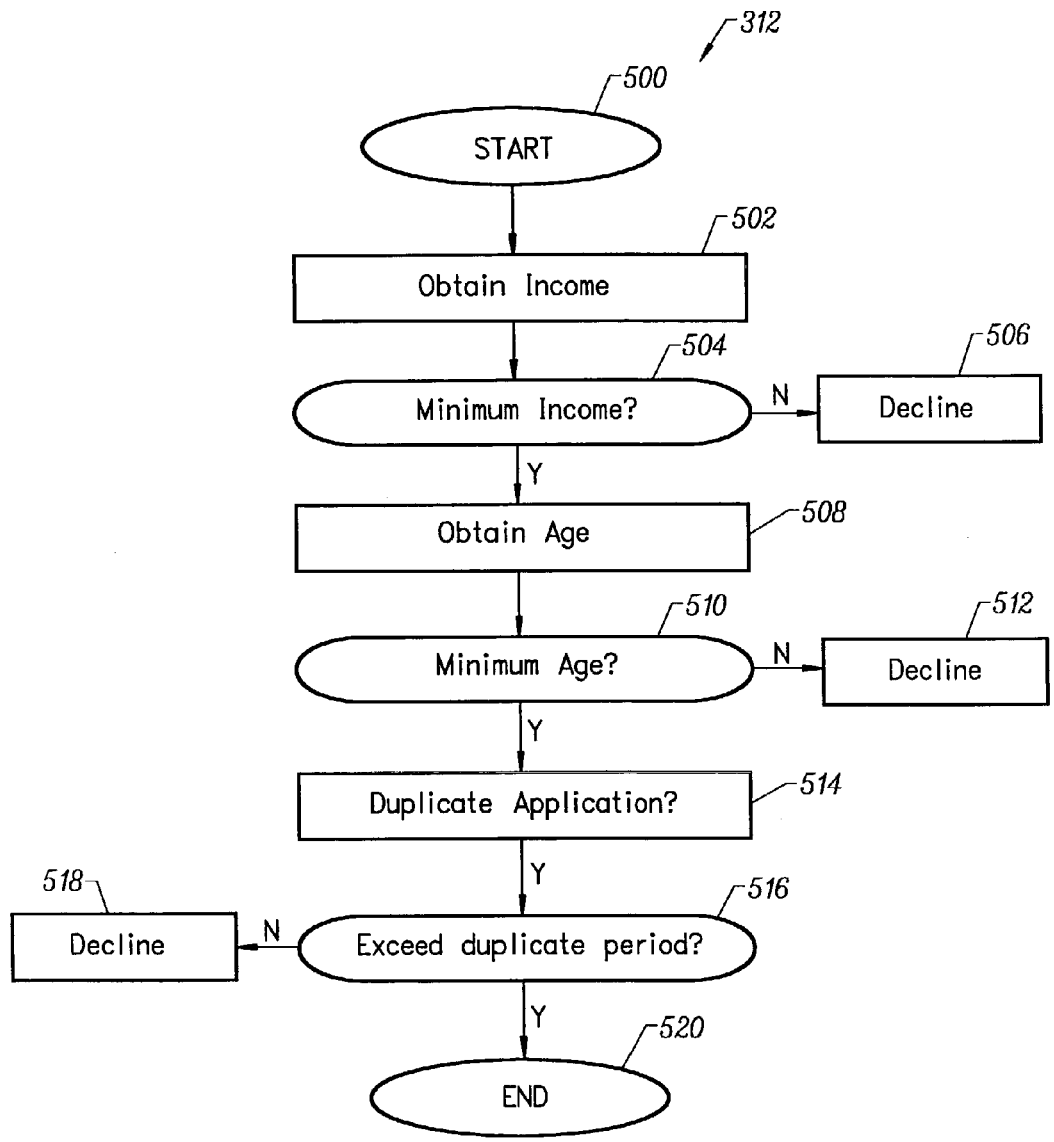
FIG. 5 is a flow chart illustrating a pre-credit bureau test performed in one embodiment of the invention.

FIG. 5 is a flow chart illustrating a pre-credit bureau test performed in step 312 in one embodiment of the invention. Pre-credit bureau tests are performed prior to obtaining one or more credit reports for the applicant for the purpose of avoiding the expense of obtaining a credit report for certain applicants who would not be approved regardless of the content of the credit report. For an example, an applicant could be rejected based the applicant being of a minor age. In one embodiment, the pre-credit bureau test is performed by the Underwriter. In other embodiments, the pre-credit bureau test may be performed by the parsing engine or a separate module. The process starts at 500. In a step 502, the applicant's income is obtained. Next, at step 504, it is determined if the applicant's income exceeds an annual income criteria. If the applicant does not meet the annual income criteria, the status of the application may be set to declined in a step 506. By way of example, if the income entered by the applicant is less than $15,000, the status of the application may be set to declined. In a step 508, the applicant's age is obtained. In a step 510, the applicant is verified to meet a minimum age criteria. For example, the minimum age may be 18. If the applicant fails to meet the minimum age criteria, the application status may similarly be set to declined in a step 512. It should be noted that the above description recites that age and income are checked in separate steps. Alternatively, they may be checked together.

If the applicant meets the minimum age and income requirements, then control is transferred to a step 514. Step 514 checks whether the application entered is a duplicate application. If the applicant has previously entered the information in the application database, then the current application is a duplicate application. It is important to recognize such duplicate applications so that a single applicant cannot require multiple credit reports to be obtained. In one embodiment, duplicate applications are recognized by checking for duplicate social security numbers, duplicate names and/or duplicate addresses. In order to be rejected by the system, an application must match two of the three criteria. A rule is established that an applicant may reapply for a credit card after a specified time period has elapsed (e.g., 60 days). Such a rule is implemented in a step 516 that checks whether the application submission date exceeds a specified time period since the submission date of the found duplicate application. If the application is submitted prior to the specified time period, the status of the application is changed to duplicate in a step 518 and the process ends at 520.

When a duplicate application is submitted, then the applicant is notified and a message is provided that informs the applicants that duplicate applications may not be submitted within a certain time period of each other. In addition, the applicant may also be prompted to go to a re-entry screen that allows the found duplicate application to be processed if processing of that application was previously interrupted. In this manner, if an applicant quit in the middle of the application process, then the application process can be completed for the previously submitted application.

It should be noted that a specific series of pre-credit bureau tests have been shown for the purpose of illustration. Other tests can be used within the scope of this invention. Also, it should be noted that if one test is failed, then remaining tests are skipped in some embodiments. Alternatively, all of the pre-credit bureau tests may be performed and the pre-credit bureau test results may be stored in separate question objects. This may help detect potentially fraudulent applicants who create many duplicates. If an application is determined potentially to be fraudulent, the status of the application is changed to fraud. Alternatively a separate flag may be set to indicate the potential fraud.

Once it is determined the applicant has entered data that is at least potentially valid and the applicant has approved the output of the parsing engine, the application is ready to be checked by the Underwriter to determine whether credit should be approved for the applicant. The Underwriter makes such a determination based on the information obtained from credit bureaus. Since the decision made by the Underwriter is made without human intervention, it is particularly important that the method of determination made by the Underwriter is reliable. For this reason, it is preferred that, in order for an applicant to be approved, at least two credit bureaus must provide information about that applicant that passes a series of tests. In some embodiments, this rule may be relaxed, but a process that requires data from at least two credit bureaus for approval has been shown to have superior reliability to processes without such a requirement. In particular, it has been determined that requiring data from at least two credit bureaus for approval is an important factor in enabling the real time credit approval system to make sufficiently reliable determinations.

Because at least two credit reports from two different credit bureaus are required, it is possible that certain applicants may be rejected because they are only included in the records of a single credit bureau. When this occurs, that reason for rejection is given to the applicant instead of a reason based on the failure of the applicant to pass a test based on credit bureau data.

Figure 6A:
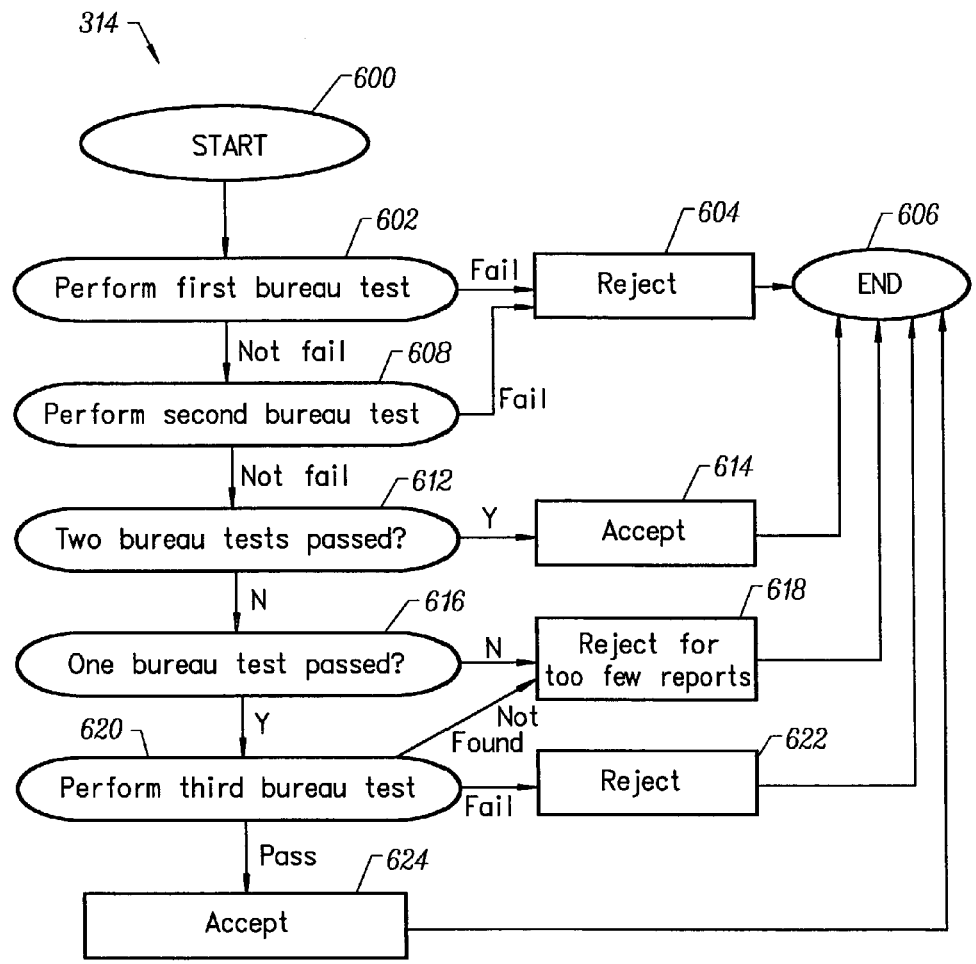
FIG. 6A is a flow chart illustrating a process for making an underwriting decision using multiple credit reports.

FIG. 6A is a flow chart illustrating a process for making an underwriting decision using multiple credit reports. The process starts at 600. In a step 602, a first credit bureau test is performed. The process of performing a test on individual credit bureau data is further described in FIG. 6B. If that test is failed, then the application is rejected in a step 604 and the process ends at 606. Immediately rejecting the application after a first failure saves the cost of obtaining a second credit bureau report. If the first credit bureau test does not fail, either because no report is obtained or because the test is passed, then control is transferred to a step 608 and a second credit bureau test is performed. If that test is failed, then the application is rejected in step 604 and the process ends at 606. If the second credit bureau test does not fail, then it is determined in a step 612 whether two credit bureau tests have been passed. If two tests have been passed, then the application is accepted in a step 614 and an offer is determined as described below.

If two credit bureau tests have not been passed, then control is transferred to a step 616 where it is determined whether one credit bureau test has been passed. If one credit bureau test has not been passed, then the application is rejected in a step 618 for not having a record in at least two credit bureaus. The third credit bureau is not checked since it is not possible to get at least two credit reports at that point. If one credit bureau test has been passed, then a third credit bureau is consulted in a step 620. If the third credit bureau test is failed, then the application is rejected in a step 622 and the process ends at 606. If the third credit bureau report does not have a record for the applicant, then the application is rejected in step 618 for not having enough credit records and the process ends at 606. If the third credit bureau test is passed, then the application is accepted in a step 624 and the process ends at 606.

Thus, the Underwriter only accepts applications that pass at least two credit bureau tests. It should be noted that a special reason for rejection may be given to applicants who are rejected because they do not have a record in at least two credit bureaus. Also, it should be noted that in some embodiments, it is distinguished whether a credit report is not obtained because a credit bureau is temporarily unavailable or whether a credit report is not obtained because there is no record for the applicant. In the event that a credit bureau is unavailable, an applicant that cannot be found in the remaining two credit bureaus may be given a special rejection notice indicating that a later attempt should be made by the applicant when the unavailable credit bureau is functioning. Also, when two credit bureaus are unavailable at the same time, all applicants may be requested to reapply when the credit bureaus return on line.

Figure 6B:
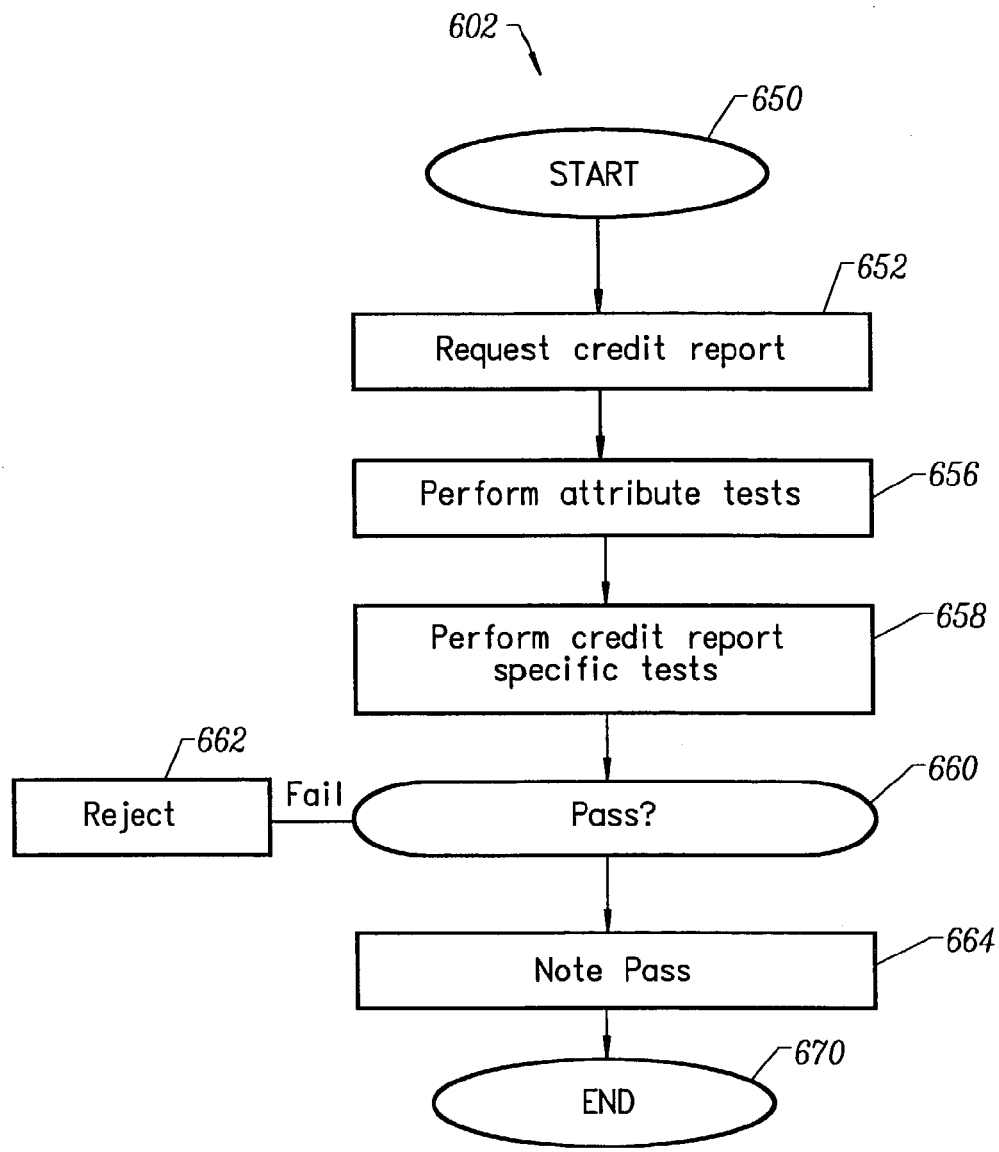
FIG. 6B is a flow chart illustrating a process implemented on the Underwriter for using credit bureau data to accept or reject an applicant in one embodiment.

FIG. 6B is a flow chart illustrating a process implemented on the Underwriter for using credit bureau data to accept or reject an applicant in one embodiment. The process starts at 650. In a step 652, a credit report is requested from the credit bureau. As described above, the credit report can be requested using data entered directly by the applicant because the parsing engine classifies the data into appropriate fields to be sent to the credit bureau. Once the report is received, the Underwriter performs tests on the data in the credit report. Data entered by the applicant may be used for Underwriter tests as well. In a step 656, a set of attribute tests are performed using the credit report. Attribute tests are general tests that may be applied to any credit report. Each attribute test corresponds to a general attribute provided in the credit report. Attribute tests may include threshold tests, which compare certain parameters such as a FICO score to a threshold, or logical tests, which check for the existence of certain adverse records. Next, in a step 658, a set of credit report specific tests are performed using the credit report. A set of credit report specific tests may be defined for each credit bureau. Each credit report specific test corresponds to data that is specific to a particular credit bureau.

The credit bureau tests may be separately performed to avoid performing the remaining tests once the failure of the application to pass a test results in a determination that the application will be declined. However, each of the set of attribute tests and credit report specific tests are preferably performed so that the best basis for rejection may be identified and provided to the applicant. Determining an appropriate basis of rejection to display to the applicant is described further below in connection with FIG. 7. It is determined in a step 660 whether the applicant passed the credit tests and the application is rejected in a step 662 if the applicant failed the tests. If the applicant passes the tests, that is noted in a step 664 for the purpose of determining whether the applicant should be accepted as described in FIG. 6A. The process then ends at 670.

As described above, the process of performing the various tests may generally be considered as performing various attribute tests and credit specific tests and combining the results of those tests in some fashion to make a decision to pass or fail an applicant.

Figure 6C:
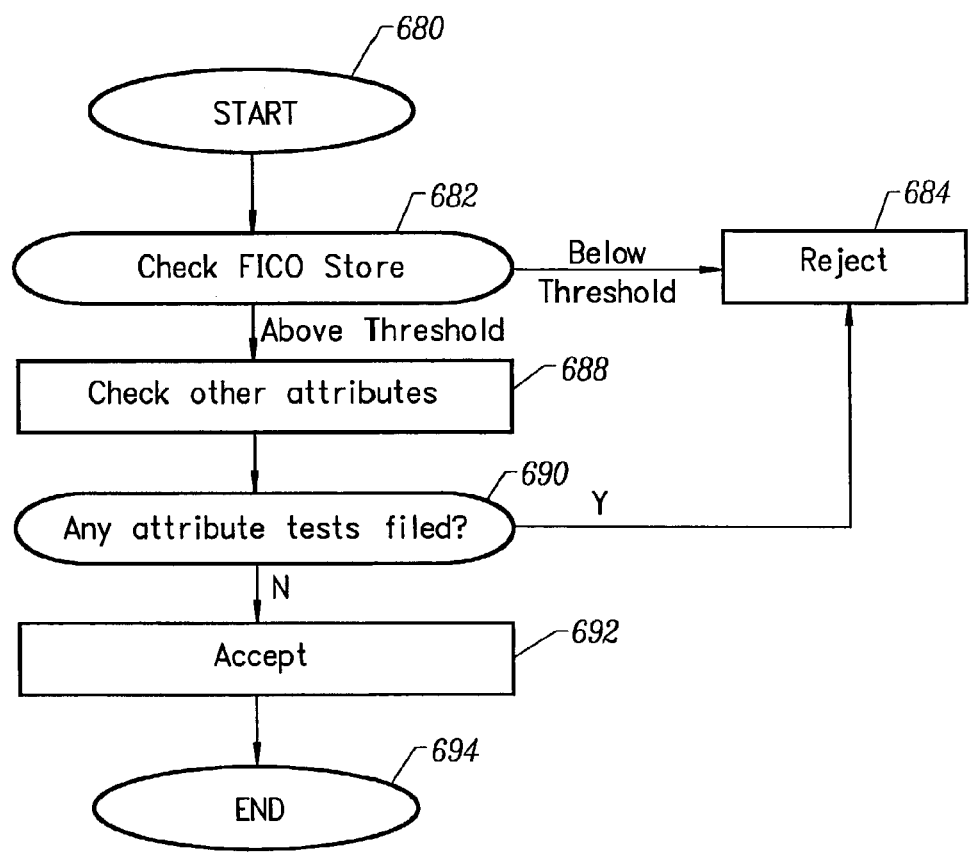
FIG. 6C is a flow chart illustrating a process for using the FICO score combined with other attributes to accept or reject an applicant.

FIG. 6C is a flow chart illustrating a process for using the FICO score combined with other attributes to accept or reject an applicant. The process starts at 680. In a step 682, the FICO score is checked. If the FICO score is below a rejection threshold, then the application is rejected in a step 684. If the FICO score is above an acceptance threshold, then control is transferred to a step 688 and other attributes are checked. If any attribute tests are failed, then control is transferred to step 688 by a step 690 and the application is rejected. If all attribute tests are passed, then control is transferred to a step 692 and the application is accepted. The process ends at 694.

It should be noted that in other embodiments, other methods of determining whether to accept or reject an applicant are used. For example, in one embodiment, an applicant is accepted automatically if he or she has a FICO score that is above a certain threshold.

The attribute tests performed in step 688 may take on various forms. In one embodiment, a list of attributes is checked including attributes such as whether the applicant is severely delinquent, currently delinquent, has a derogatory public record, or has been delinquent a certain number of times in a past period. A test may be defined for each attribute such as a maximum number of times delinquent above which the test is failed. In one embodiment, a list of tests is defined and all of the tests must be passed. In another embodiment, a list of tests is defined and certain subsets of the list are also defined. At least one subset must be passed for the applicant to pass.

Once the decision is made to accept or reject an applicant, the status of the applicant is set to be accepted or rejected. Rejected applications are processed in a rejection process described in FIG. 7. Accepted applications are processed in an offer and confirmation process described in FIG. 10A.

Figure 7:
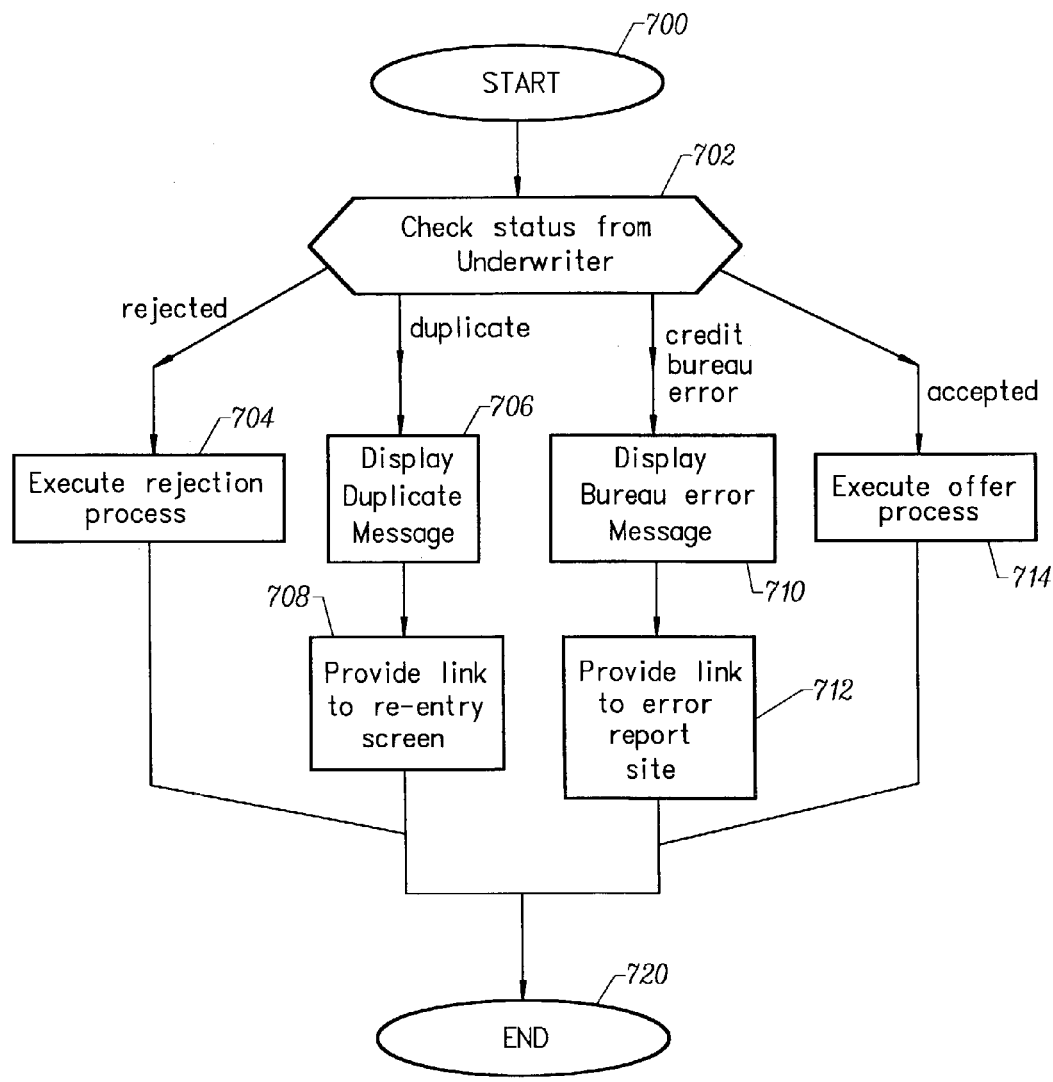
FIG. 7 is a flow chart illustrating a process for checking the status of an application and executing either an offer process or one of several rejection processes.

FIG. 7 is a flow chart illustrating a process for checking the status of an application and executing either an offer process or one of several rejection processes. The process starts at 700. In a step 702, the status of the application is checked based on the processing performed by the Underwriter. As mentioned above, the Underwriter determines whether the application is a duplicate application, whether enough credit bureaus are available to provide sufficient credit reports to evaluate the application, and whether applications having sufficient credit reports should be accepted or rejected.

If the status of the application determined by the Underwriter is that the application is a duplicate of a previously entered application, then control is transferred to a step 706 and a message indicating that the application is a duplicate is displayed to the applicant. Next, in a step 708, a link to a reentry screen is provided to the applicant. The reentry screen allows the applicant to execute a process that finds the earlier application and allows the applicant to review or resume the earlier application. For example, if the earlier application was accepted but the applicant did not accept an offer, then the process may resume at that point and the applicant may be given another opportunity to accept. This is preferable to allowing the application process to be repeated from the beginning since that could needlessly cause a new credit report to be obtained. After the reentry screen is displayed, the process ends at 720.

If the status of the application indicates that the application has been accepted, then control is transferred to a step 714 and an offer process is executed. The offer process is described in further detail in FIG. 10. If the status of the application is that a credit bureau error occurred, then control is transferred to a step 710 and an error message is displayed indicating that not enough credit bureaus are currently available to allow the application to be processed. Also, in a step 712, a link is provided to a site that allows the applicant to report the error and request further information or request to be contacted. After the offer process or the credit bureau error process is executed, the process ends at 720.

If the status of the application indicates that the application has been rejected, then control is transferred to a step 704 and a rejection process is executed. The rejection process is described in further detail in FIG. 8A and FIG. 8B. Once the rejection process is executed, the process ends at 720.

Figure 8A:
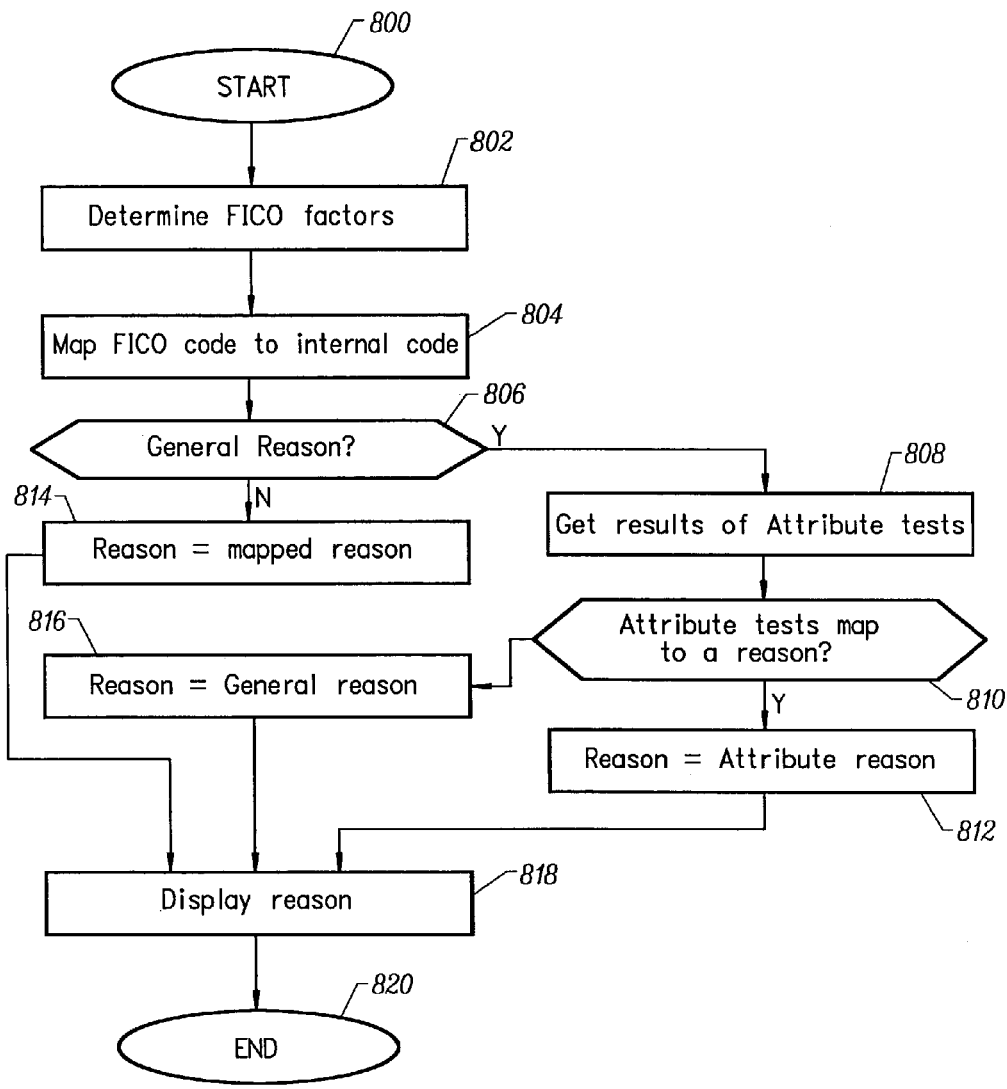
FIG. 8A is a flow chart illustrating a process for determining an appropriate reason to display for rejecting an applicant and displaying that reason.

FIG. 8A is a flow chart illustrating a process for determining an appropriate reason to display for rejecting an applicant and displaying that reason. The process starts at 800. In a step 802, the main factors given by the credit bureau that affect the FICO score are obtained. Generally, the main factors identified by the credit bureau for the FICO score are provided in the form of a numerical code that corresponds to a predetermined factor. In a step 804, the credit bureau code is mapped to an internal code that is determined from a data structure that maps bureau codes to internal factors. In one embodiment, the data structure is a table such as that illustrated in FIG. 8B.

Certain credit bureau codes that indicate positive factors that would be inappropriate bases for rejection such as home ownership are mapped by the data structure to a general rejection reason such as "Applicant rejected based on FICO score" or "Applicant rejected based on credit bureau data." Although such general reasons may be provided to the applicant as a last resort, it is preferred that a more specific reason be given. To that end, a step 806 checks whether any of the FICO reasons have been mapped to any specific rejection reasons. If all of the FICO reasons map only to the general reason, then control is transferred to a step 808.

In step 808, the rejection process begins to attempt to find a more appropriate reason for rejection of the applicant. First, the results of the various attribute tests generated by the Underwriter are obtained. In a step 810, it is checked whether any of the attribute test results map to an appropriate rejection reason. If an attribute test result maps to an appropriate reason, then control is transferred to a step 812 and the attribute reason is assigned as the reason given to the applicant upon rejection. If the attribute test does not map to an appropriate reason, then control is transferred to a step 816 and a general reason is assigned as the reason given to the applicant upon rejection. If, in step 806, it was determined that one or more of the FICO score factors identified by the credit bureau correspond to an acceptable rejection reason other than the general rejection reason, then that reason is assigned as the reason to be given to the applicant in a step 814. Whether or not a specific reason is identified by that above mentioned steps, control is transferred to a step 818 where the reason is displayed to the applicant and the process then ends at 820.

FIG. 8B is a diagram illustrating one data structure used to map main FICO factors provided by the credit bureau (referred to as external codes) to internal decline codes as well as reasons for rejection to be provided to rejected applicants. It should be noted that although a table is shown, other data structures such as a linked list are used in other embodiments. Each external code maps to an internal code that corresponds to an internal reason for rejecting the applicant. The actual reason is also stored for each internal code. As described above, certain external codes correspond to internal codes that provide only a general rejection reason. Other external codes are mapped to internal codes that allow a specific rejection reason to be given.

Figure 9:
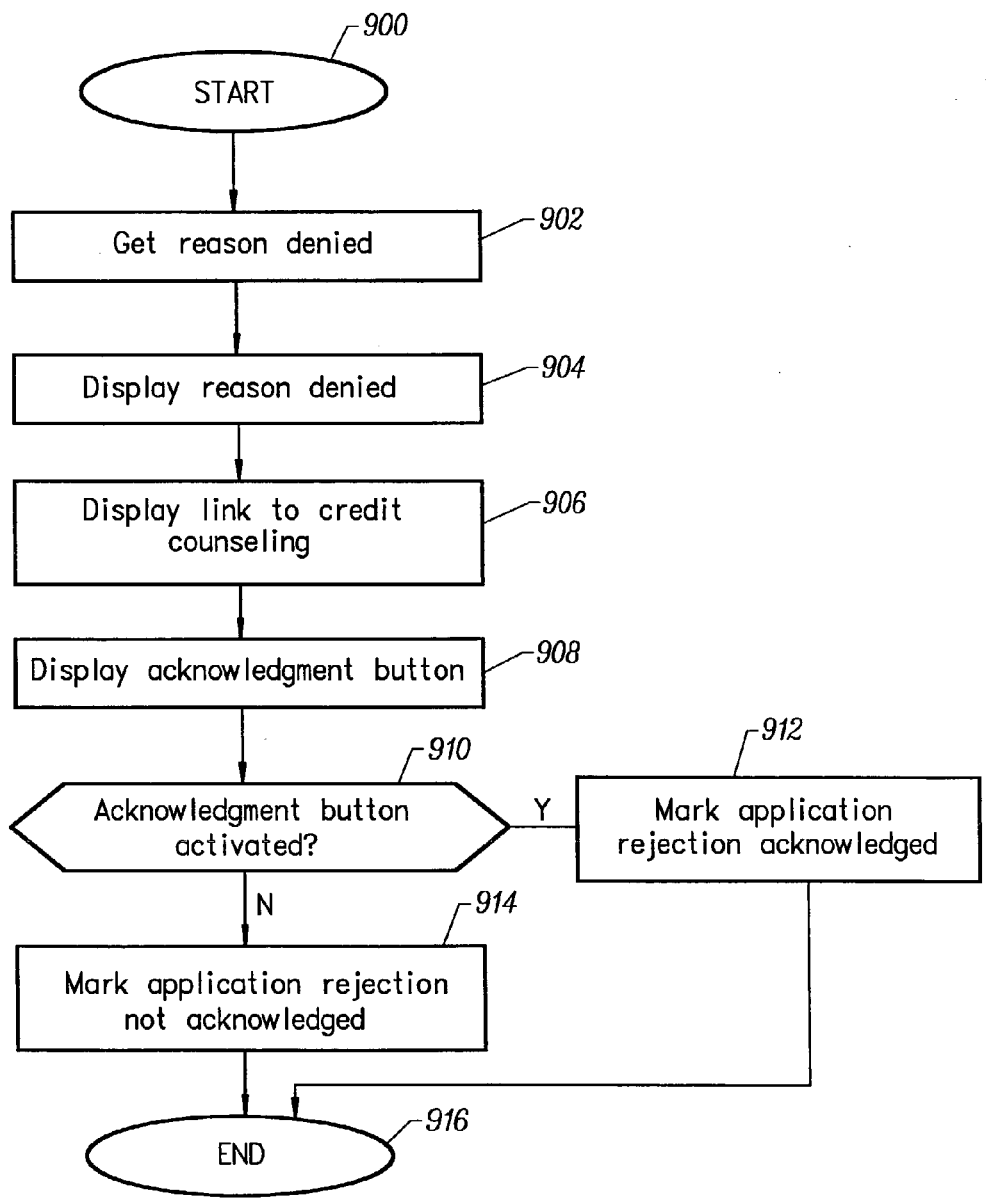
FIG. 9 is a flow chart illustrating how a rejection reason may be obtained.

Once an appropriate rejection reason is selected, it is necessary to display the reason to the applicant. In one embodiment, the reason is displayed on a web page along with an acknowledgement button that allows the applicant to acknowledge that he or she has read the rejection message. FIG. 9 is a flow chart illustrating how a rejection reason may be obtained. The process starts at 900. In a step 902, the reason for rejection is retrieved. Next, in a step 904, the rejection reason is displayed. In addition, in a step 906, a link to a credit counseling site is also displayed. The acknowledgement button is displayed in a step 908. When the applicant leaves the rejection page, a step 910 checks whether the acknowledgement button has been activated. If the button has been activated, then control is transferred to a step 912 where the application is marked as having had an acknowledgement to a rejection. If the acknowledgement button has not been activated, then control is transferred to a step 914 and the application is marked as not having had an acknowledgement to a rejection. The process ends at 916.

It should be noted that other methods of verifying that a rejection has been received are used in other embodiments. For example, in one embodiment, an applet is sent along with the rejection that sends a message back to the credit approval system when the rejection message page is completely downloaded by the applicant. In this manner, the fact that a rejection was delivered to the applicant can be verified without requiring any action by the applicant.

Once the rejection has been sent and acknowledged or not, the rejection or acknowledgement status may be provided to an entity such as FDR for the purpose of generating hard copies of rejection letters and either sending such hard copies as confirmations to all rejected applicants or else, in some embodiments, only sending hard copies of rejection letters to applicants that have not acknowledged an on line rejection.

Accepted applications have an accepted status and they also contain important applicant information supplied by the applicant and obtained from the credit bureau reports that can be used to design a custom account level offer for the applicant. Preferably, multiple offers are presented to the applicant, allowing the applicant to select an offer that includes terms that the applicant desires to accept.

Figure 10A:
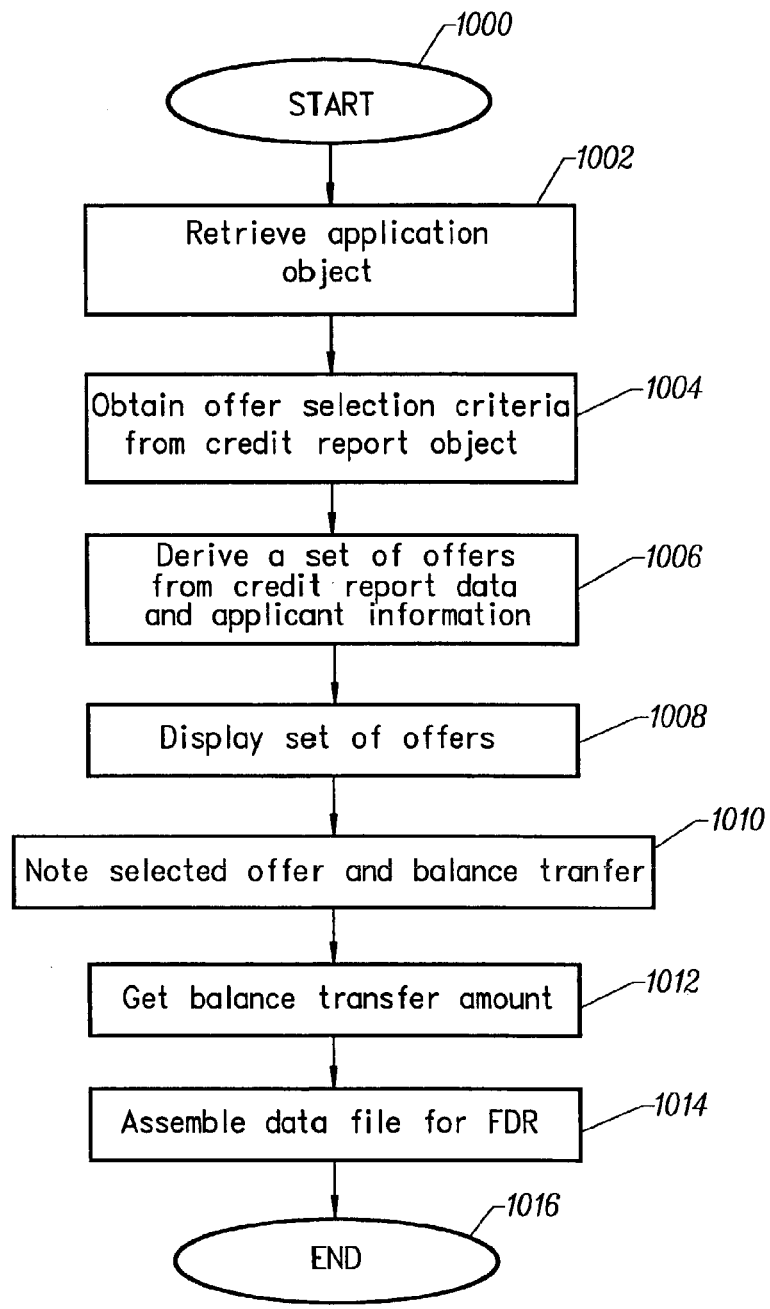
FIG. 10A is a flowchart illustrating a process for providing a set of multiple offers to an applicant and receiving a balance transfer amount corresponding to an offer selected by the applicant.

FIG. 10A is a flowchart illustrating a process for providing a set of multiple offers to an applicant and receiving a balance transfer amount corresponding to an offer selected by the applicant. The process starts at 1000. In the step 1002, the application object is retrieved. The application object includes the information provided by the applicant as well as information obtained from credit bureaus and analyzed by the Underwriter.

Next, in a step 1004, offer selection criteria are obtained from the credit report object. In one embodiment, the offer selection criteria include FICO score, income and a balance transfer requirement. Offer selection criteria also may include data entered by the applicant. The offer selection criteria also may include other attributes such as time on file. In general, the offer selection criteria are selected from information obtained from the applicant and from the credit bureaus for the purpose of estimating the applicant's risk of default to determine an expectation of future loss as well as an expected future total revolving balance (TRB). In this manner, an appropriate offer may be determined. In one embodiment, the balance transfer requirement is calculated as a selected percentage of the applicant's TRB. As described below, different offer terms may be provided for different balance transfer requirements. As noted above, in other embodiments, other data structures than the application object are used to store this information.

Next, in a step 1006, a set of offers is derived from the credit report data and other applicant information stored in the application object. In a step 1008, the set of offers is displayed. In one embodiment, the offers are derived from the FICO score and income of the applicant, which determine the risk of default, and also from a balance transfer amount specified in the offer. The balance transfer amount may be determined as a percentage of the total revolving balance that the applicant has on all outstanding credit cards in the credit report for the applicant. Both the credit limit offered to the applicant and the interest rate offered to the applicant may vary according to the amount of the total revolving balance that the applicant chooses to transfer to the new account.

In addition offers may present incentives such as frequent flier miles, cash back on purchases, or favorable interest rates.

In a step 1010, the system notes the selected offer and balance transfer amount. Next, in a step 1012, the system obtains the balance transfer amount from the applicant. Preferably, the balance transfer is actually executed while the applicant is on line. The process for obtaining and executing the balance transfer in real time on line is described further in FIG. 13. Once the balance transfer is executed, a data file is assembled for transmission to FDR for the purpose of issuing a credit card in a step 1014. The process ends at 1016. Thus, the system derives a set of offers based on information from the applicant's credit reports and displays the set of offers to the applicant. The applicant then can select an offer based on the amount of balance transfer that the applicant wishes to make. Once the applicant selects an offer and a balance transfer amount, the system actually executes the balance transfer by allowing the applicant to select the accounts from which to transfer balances. Once the balance transfer is executed, the data relating the application is assembled and sent to FDR.

Figure 10B:
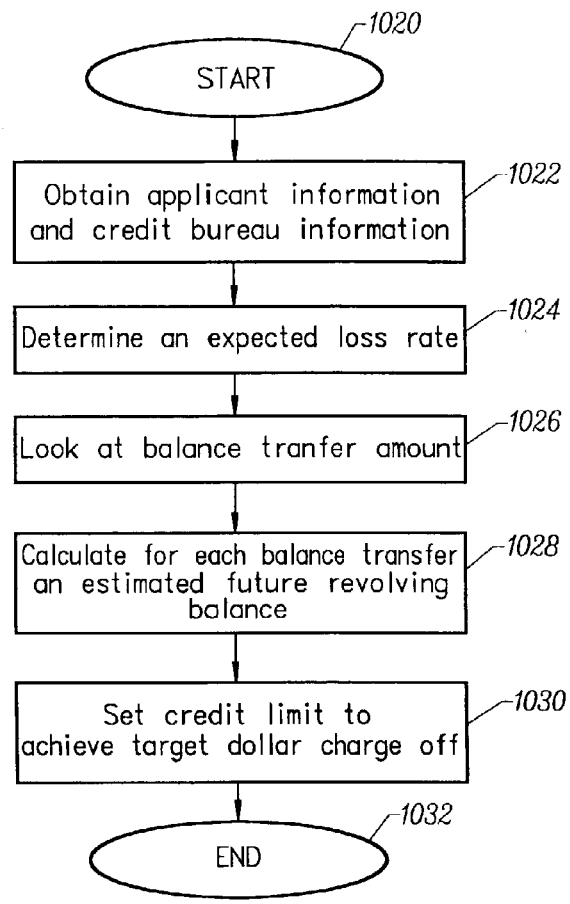
FIG. 10B is a flow chart illustrating one such method of deriving a credit limit for an applicant based on the applicant's FICO score and income, as well as the amount of total revolving balance that the applicant elects to transfer.

In different embodiments, the system uses different methods of determining the terms of the offer extended to the applicant based on the information derived from the credit report. FIG. 10B is a flow chart illustrating one such method of deriving a credit limit for an applicant based on the applicant's FICO score and income, as well as the amount of total revolving balance that the applicant elects to transfer. The process starts at 1020. In a step 1022, the system obtains applicant information and the credit bureau information. This information may include the FICO score and income of the applicant. Next, applicant information and the credit bureau information are used to determine an expected unit loss rate for the applicant In a step 1024. The unit loss rate corresponds to the probability that the applicant will default on the credit line extended. That probability multiplied by the credit limit extended to the applicant determines the dollar loss rate for that applicant. The dollar loss rate divided by the average total outstanding balance of the account is the dollar charge off rate for the applicant.

In one embodiment it is desired that a dollar charge off rate be kept within a determined range for different applicants. To accomplish this, it is desirable to extend smaller amounts of credit to applicants with a higher probability of defaulting. It is also useful to extend different amounts of credit based on a total outstanding balance transferred by the applicant since the balance transfer influences the likely future total outstanding balance of the account. Conventional offer systems have been able to extend offers to applicants with credit limits that are controlled by the applicant's predicted average dollar loss. However, prior systems have not been able to extend credit and determine a credit limit based on a predicted total outstanding balance for the client because they have failed to be able to present offers and condition the acceptance of the offers in real-time on a balance transfer made by the applicant.

Next, in a step 1026 the system determines one or more balance transfer amounts based on the total revolving balance that the applicant has in various other credit card accounts. In one embodiment, the balance transfer amounts are calculated based on different percentages of the total revolving balance determined from all of the applicant's accounts found in the credit report. Then, in a step 1028, the system calculates for each total balance transfer amount choice that will be presented to the applicant, a predicted estimated revolving balance for the future that the applicant would be expected to maintain. The estimated total revolving balance may be equal to the balance transfer amount or may be a function of the balance transfer amount. In one embodiment, the estimated total revolving balance does not depend on the balance transfer amount. In one embodiment, four possible percentages of the applicant's total revolving balance as determined by the credit report are presented to the applicant. Those choices are none of the balance, one-third of the balance, two-thirds of the balance, and the full balance. Depending on which of those amounts is selected by the applicant, the system calculates a predicted total revolving balance for the future. Then, in a step 1030, the credit limit for the applicant is set to achieve a target dollar charge off rate based on the amount of the total revolving balance that the applicant elects to transfer and the risk of default. The process then ends at 1032.

Figure 10C:
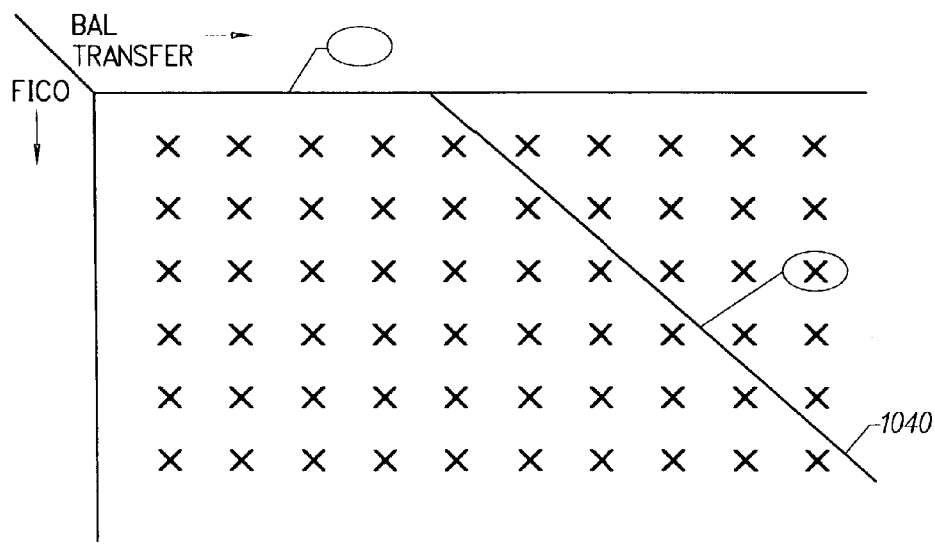
FIG. 10C is a table illustrating looking up an applicant's FICO score and balance transfer amount to find a corresponding credit limit.

The process described in FIG. 10B shows conceptually how a credit limit could be determined based on an amount of balance transfer and a FICO score and income. This process may be implemented directly in some embodiments. However, in other embodiments, it is preferred that a table be precalculated that includes amounts of credit limit that the applicant will be given based on certain amounts of balance transfer and FICO score. Using such a table, the applicant's FICO score and balance transfer amount may be looked up and then the credit limit may be found in the corresponding cell. FIG. 10C is a table illustrating how this is accomplished. Each row of the table corresponds to a different FICO score, and each column of the table corresponds to a different balance transfer amount. When the cell corresponding to the FICO score and balance transfer amount is determined, the credit limit obtained. A cut-off line 1040 is also shown which represents an upper limit for a balance transfers for a given FICO score.

In the embodiment described above, separate tables are prepared for applicants of different incomes. In addition, separate tables may also be prepared for applicants having other different characteristics such as time on file for the applicant. It should be noted that the tabular representation of the data is presented as an example only and the data may be represented in many ways including in three-dimensional or four-dimensional arrays, linked lists or other data representations optimized for a particular system. By allowing the account credit limit to be a function of FICO score, balance transfer, and income, a credit limit may be selected for each individual account that enables the dollar charge off rate for all applicants to be controlled.

FIG. 11 is another data representation illustrating another embodiment of how the offers may be determined based on FICO score, income range, income, and total revolving balance transfer. A single table includes a range of FICO scores 1108, an income range 1110, a balance transfer column 1112, and four offer columns, 1114, 1116, 1118, and 1120. Each of the offer columns includes a link to a web page that describes the offer in more detail. Once the proper row of the table is found, multiple offers may be displayed to the applicant by assembling the various links either in a single frame or in consecutive frames for the applicant to view and select an offer.

Another component of the offer granted to the applicant that may be varied based on the balance transfer selected is a teaser rate or annual rate. A teaser rate is an interest rate that is temporarily extended to the applicant either on the amount transferred or on the amount transferred and purchases made for a certain period of time. The teaser rate is intended to incent the applicant to transfer a greater balance to a new account. In one embodiment, the teaser rate is determined based on the percentage of the applicant's total revolving balance that the applicant elects to transfer. Thus, the amount transferred by the applicant controls not only the applicant's credit limit but also determines a teaser rate extended to the applicant.

FIG. 12 is a diagram illustrating a display provided to the applicant for the purpose of presenting multiple offers to the applicant. The display includes a first offer 1204, a second offer 1206, a third offer 1208, and a fourth offer 1210. For each offer, there is a column 1214 corresponding to the initial teaser rate, a column 1216 corresponding to the annual fee offer, a column 1218 corresponding to the credit limit, and a column 1220 corresponding to the required balance transfer for that offer to be accepted. The applicant selects one of the offers from the table. As noted above, in one embodiment, the offers are provided as part of a web page and the offers are presented using html. By selecting an offer, the applicant selects a link that indicates to the system which offer is selected. Once an offer is selected, the process of acquiring the required balance transfer in real-time from the applicant is executed. That process is described further in FIG. 13.

Figure 13:
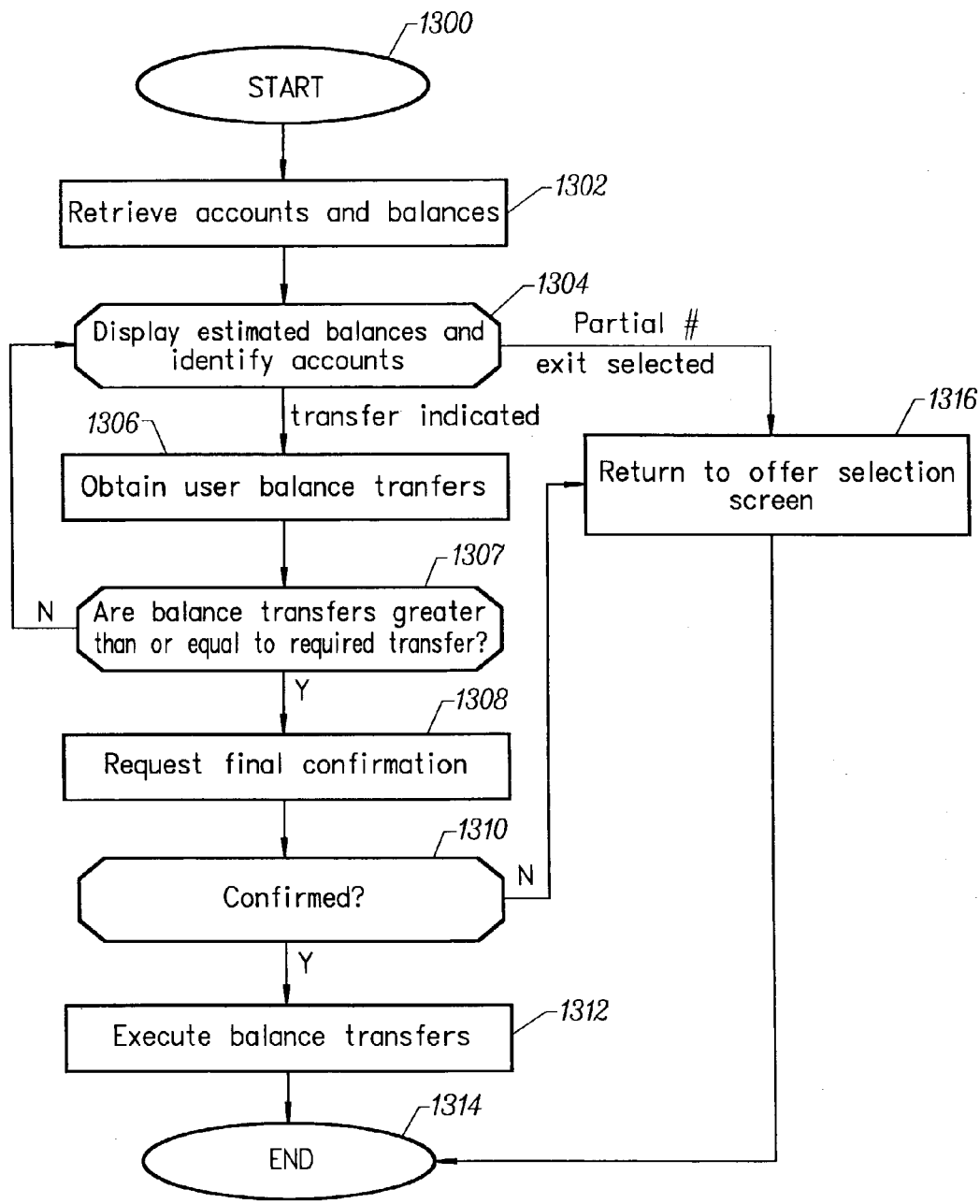
FIG. 13 is a flow chart illustrating a process for obtaining a real-time balance transfer from an applicant.

FIG. 13 is a flow chart illustrating a process for obtaining a real-time balance transfer from an applicant. The process starts at 1300. In a step 1302, the system retrieves the accounts and balances that the applicant has based on the credit report data obtained for the applicant. Next, in a step 1304, the estimated balances for each of the accounts that were retrieved in step 1302 are presented to the applicant and the accounts are identified. Identification of the accounts is a sensitive issue because the specific account data for the applicant is confidential and if the information is displayed to an unauthorized person, fraud could result. Therefore, in one embodiment, a partial account number that lists the account granting institution as well as part of the account number for the account held by the applicant with that institution is displayed. Generally, this information is sufficient for the applicant to recognize the account, but is not enough information to present a fraud risk.

It should be noted that in some embodiments, the accounts chosen for display by the underwriter are selected in a manner to facilitate a simpler balance transfer. For example, the largest account balances may be displayed first so that amounts may be efficiently transferred to meet the required transfer. Also, a group of balances to transfer may be presented to the applicant by highlighting certain accounts.

Next, the applicant is given an opportunity to indicate a balance transfer by selecting one of the accounts and indicating the amount to be transferred. It should be noted that the applicant in this manner does not need to provide account information to execute a balance transfer. If a transfer is indicated, control is transferred to a step 1306 and the amount of the user balance transfer is obtained. Next, in a step 1307, it is determined whether the sum of the balance transfers is greater than or equal to the required transfer amounts for the offer selected by the applicant. If the amount is not greater than or equal to the required-transferred amount, then control is transferred back to step 1304 and the applicant is given an opportunity to select further balances to transfer. If the amount of the balance transfers is greater than or equal to a required transfer amount, then control is transferred to a step 1308 and the system requests final confirmation from the applicant of the balance transfers. If it is determined in a step 1310 that a confirmation of the balance transfer has been received, then control is transferred to a step 1312 and the balance transfers are executed. The process ends at 1314.

If in step 1304, it is determined that the applicant has elected to exit the balance transfer screen instead of indicating a balance transfer, or if it is determined in step 1310 that the applicant elects not to confirm the balance transfer amounts selected, then control is transferred to a step 1316 and the applicant is returned to the offer selection screen so that the applicant will have an opportunity to select another offer that either does not require a balance transfer or requires less of a balance transfer. The process then ends at 1314.

Figure 14:
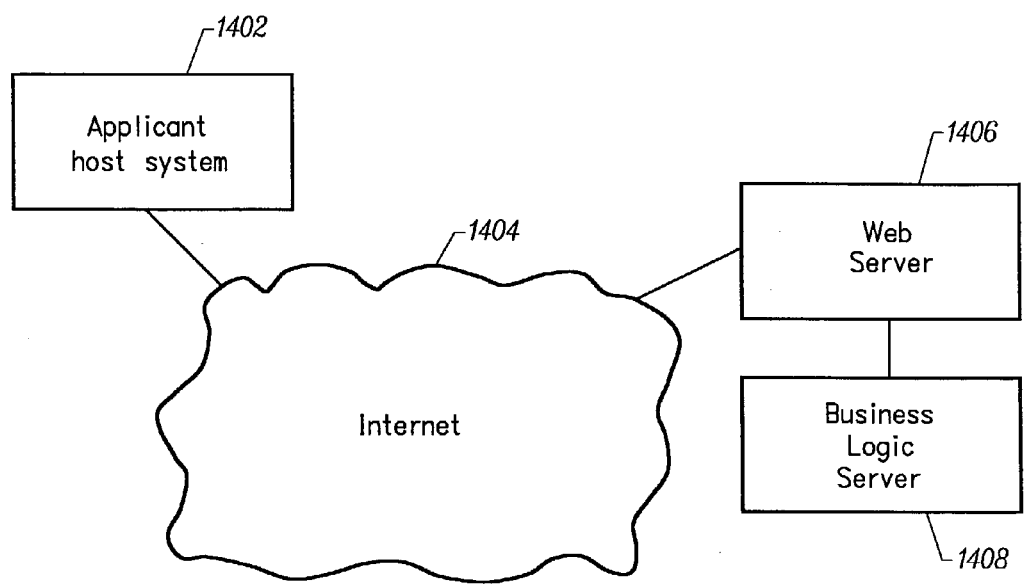
FIG. 14 is a block diagram illustrating one computer network scheme that may be used to implement the system described herein.

FIG. 14 is a block diagram illustrating one computer network scheme that may be used to implement the system described herein. An applicant host system 1402 is connected to the Internet 1404. The applicant host system may be a PC, a network computer, or any type of system that is able to transmit and receive information over the Internet. Also, in other embodiments, a private network such as a LAN or WAN or a dedicated network may be used by the applicant to communicate. A web server 1406 is also connected to the Internet and communicates with the applicant host system via the Internet to request receive applicant information and to notify the applicant of the results of the approval process. Web server 1406 in one embodiment accesses a business logic server 1408 that implements the various approval checking processes described herein. It should be noted that in some embodiments, the web server and the business logic server are implemented on a single computer system with one microprocessor. However, for the sake of efficiency, the system implemented as shown is often used with different servers dedicated to communicating with applicants and processing applicant data, respectively. The business logic server, wherever implemented, includes a communication line on which communication may be had with credit bureaus or other outside data sources. In some embodiments, an Internet connection may be used for that purpose. Thus applicant data is obtained by the business logic server either over the Internet either directly or through a Web server. Also, data may be obtained by the business logic server from an applicant using a direct dial in connection or some other type of network connection.

A system and method has been disclosed for generating an appropriate rejection reason to give to a rejected applicant for credit, displaying such a reason, and verifying that the applicant has viewed the reason. Software written to implement the system may be stored in some form of computer-readable medium, such as memory or CD-ROM, or transmitted over a network via a carrier wave in the form of Java® applets, other forms of applets or servlets, and executed by a processor. The system may be implemented on a PC or other general purpose computer known in the computer art.

It should be recognized that the system described may also be used for the purpose of granting or rejecting credit to an applicant for the purpose of making a single transaction. In such a system, a transaction is interrupted and the application for credit is made. Based on the real time approval decision made, credit may or may not be granted for the purpose of completing the transaction.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of presenting a reason for the rejection of a credit application from an applicant comprising: electronically obtaining a factor from a credit bureau identified as influencing the FICO score assigned to the application by the credit bureau; using a computer processor to: map the factor identified by the credit bureau to an internal rejection code; determine whether the internal rejections code corresponds to a specific code or a general code; change the internal rejection code to correspond to a specific rejection reason if it is determined that the internal rejection code corresponds to a general code and the specific rejection reason is available; and providing a rejection reason corresponding to the internal rejection code to the applicant via a network; wherein the internal rejection code indicates the reason the credit application is rejected.

2. A method of presenting a reason for the rejection of a credit application as recited in claim 1 further including electronically requesting an acknowledgement of the rejection from the applicant.

3. A method of presenting a reason for the rejection of a credit application as recited in claim 2 further including electronically receiving an acknowledgement of the rejection from the applicant and recording that the acknowledgement was received.

4. A method of presenting a reason for the rejection of a credit application as recited in claim 1 wherein providing a rejection reason corresponding to the internal rejection code to the applicant further includes providing a web page to the applicant that includes the rejection reason.

5. A method of presenting a reason for the rejection of a credit application as recited in claim 4 wherein providing a web page to the applicant that includes the rejection reason further includes providing an acknowledgement button to the applicant as part of the web page.

6. A method of presenting a reason for the rejection of a credit application as recited in claim 4 wherein providing a web page to the applicant that includes the rejection reason further includes providing an applet that communicates that the web page has been downloaded.

7. A system for presenting a reason for the rejection of a credit application from an applicant comprising: a communication interface; and a processor configured to: obtain a factor from a credit bureau identified as influencing the FICO score assigned to the application by the credit bureau, map the factor identified by the credit bureau to an internal rejection code; determine whether the internal rejection corresponds to a specific code or a general code; change the internal rejection code to correspond to a specific rejection reason if it is determined that the internal rejection code corresponds to a general code and the specific rejection reason is available; and provide a rejection reason corresponding to the internal rejection code to the applicant via the communication interface; wherein the internal rejection code indicates the reason the credit application is rejected.

8. A computer readable medium having program code embodied therein for presenting a reason for the rejection of a credit application from an applicant comprising: program code operative to obtain a factor from a credit bureau identified as influencing the FICO score assigned to the application by the credit bureau; program code operative to map the factor identified by the credit bureau to an internal rejection code; program code operative to determine whether the internal rejection corresponds to a specific code or a general code; program code operative to change the internal rejection code to correspond to a specific rejection reason if it is determined that the internal rejection code corresponds to a general code and the specific rejection reason is available, and program code operative to provide a rejection reason corresponding to the internal rejection code to the applicant; wherein the internal rejection code indicates the reason the credit application is rejected.

* * * * *